(12) United States Patent
Mathiazhagan et al.

(10) Patent No.: US 12,351,030 B2
(45) Date of Patent: Jul. 8, 2025

(54) AUTOMATIC TRANSMISSION WITH ONE OR MORE DYNAMICALLY CONTROLLABLE ONE WAY CLUTCHES

(71) Applicant: Dana Automotive Systems Group, LLC, Maumee, OH (US)

(72) Inventors: Harish Mathiazhagan, Canton, MI (US); Kyle Steinkerchner, Maumee, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/444,109

(22) Filed: Feb. 16, 2024

(65) Prior Publication Data
US 2024/0278633 A1 Aug. 22, 2024

Related U.S. Application Data

(60) Provisional application No. 63/486,397, filed on Feb. 22, 2023.

(51) Int. Cl.
*F16D 48/06* (2006.01)
*B60K 6/36* (2007.10)

(52) U.S. Cl.
CPC .............. *B60K 6/36* (2013.01); *F16D 48/064* (2013.01); *B60K 2702/02* (2013.01); *F16D 2500/70408* (2013.01)

(58) Field of Classification Search
CPC ......... F16D 48/064; F16D 2500/70408; B60K 6/36; B60K 2702/02
See application file for complete search history.

(56) References Cited

U.S. PATENT DOCUMENTS

| | | | |
|---|---|---|---|
| 8,051,959 B2 | 11/2011 | Eisengruber | |
| 8,286,772 B2 | 10/2012 | Eisengruber | |
| 9,188,174 B2 | 11/2015 | Beiser et al. | |
| 10,591,000 B2 | 3/2020 | Voelker et al. | |
| 11,286,996 B2 | 3/2022 | Pawley et al. | |

(Continued)

FOREIGN PATENT DOCUMENTS

| | | | |
|---|---|---|---|
| DE | 102019114139 B3 | 6/2020 | |
| EP | 2305501 B1 | 1/2012 | |
| WO | WO-2018107583 A1 * | 6/2018 | ............. F16H 3/003 |

OTHER PUBLICATIONS

Irato, F. et al., "Two Speed Automatic Transmission With a Friction and Dynamically Controllable One Way Clutch for Power Shifting in an Electric Vehicle," U.S. Appl. No. 18/345,320, filed Jun. 30, 2023, 47 pages.

*Primary Examiner* — Tisha D Lewis
(74) *Attorney, Agent, or Firm* — McCoy Russell LLP

(57) ABSTRACT

A transmission system for a vehicle, including an input configured to couple to a prime mover of the vehicle; a first gear ratio; a second gear ratio; a first dynamic controllable clutch operable in an engaged state, a disengaged state, and a one-way clutch state; a second dynamic controllable clutch operable in the engaged state, the disengaged state, and the one-way clutch state; an output; and a controller comprising instructions stored in non-transitory memory that are executable by the controller to: adjust a state of the first DCC and the second DCC to selectively engage the first gear ratio and the second gear ratio for providing torque transfer from the input to the output of the transmission system.

18 Claims, 7 Drawing Sheets

(56) References Cited

U.S. PATENT DOCUMENTS

| | | | |
|---|---|---|---|
| 2014/0100071 A1* | 4/2014 | Kimes | B60L 15/2054 |
| | | | 475/5 |
| 2020/0347916 A1* | 11/2020 | Sung | B60W 30/1819 |
| 2021/0348658 A1* | 11/2021 | Cioc | F16D 41/04 |
| 2024/0068560 A1* | 2/2024 | Irato | F16H 61/30 |

\* cited by examiner

AUTOMATIC TRANSMISSION WITH ONE OR MORE DYNAMICALLY CONTROLLABLE ONE WAY CLUTCHES

CROSS-REFERENCE TO RELATED APPLICATIONS

The present application claims priority to U.S. Provisional Application No. 63/486,397 entitled "AUTOMATIC TRANSMISSION WITH ONE OR MORE DYNAMICALLY CONTROLLABLE ONE WAY CLUTCHES", filed Feb. 22, 2023. The entire contents of the above identified application are hereby incorporated by reference for all purposes

TECHNICAL FIELD

The present description relates generally to a transmission using one or more dynamic one-way clutches to reduce clutch drag and/or decrease the required precision of the clutch controller.

BACKGROUND AND SUMMARY

Two speed automatic transmissions for electric vehicles may be used to increase the gradeability while still meeting the top speed and 0-60 mph targets with smaller electric motors.

Friction clutches can be used to transfer torque for just one speed or both speeds using either one or two friction clutches respectively. Using two friction clutches however has the disadvantage of the disengaged clutch drag causing inefficiencies, such as loss of torque and rotational energy.

In other attempts to address clutch drag, many transmissions use friction clutches for only one gear ratio, typically for a gear with a smaller ratio (e.g., second gear). To reduce clutch drag, the second friction clutch may be replaced with a claw clutch or a claw clutch and one-way clutch. However, both of these options use high precision controls. Without high precision controls, either the claw clutch or the claw clutch and one-way clutch may be unable to close or close before the input and output to the claw clutch and/or one-way clutch synchronize (e.g., equalize). When synchronized (e.g., equalized) the input and output rotate at approximately the same rotational speed or are within a difference of rotational speed below a threshold of rotational speed. At higher rotational speeds, relative to the rotational speeds of an internal combustion engine (ICE), the clutch claw clutch may synchronize between a smaller range of thresholds, outside of which degradation may occur. If the input and output to a claw clutch and/or one-way clutch are not synchronized, degradation may occur to the claw clutch and/or one-way clutch, their respective inputs and outputs, and other features of the transmission.

The inventors herein have recognized the above potential issues with such systems. As such, the inventors have developed a transmission system for a vehicle, comprising: an input configured to couple to a prime mover of the vehicle; a first gear ratio; a second gear ratio; a first dynamic controllable clutch (first DCC) operable in an engaged state, a disengaged state, and a one-way clutch state; a second dynamic controllable clutch (second DCC) operable in the engaged state, the disengaged state, and the one-way clutch state; an output; and a controller comprising instructions stored in non-transitory memory that are executable by the controller to: adjust a state of the first DCC and the second DCC to selectively engage the first gear ratio and the second gear ratio for providing torque transfer from the input to the output of the transmission system.

The proposed solution involves the use at least two electromagnetically operated dynamically controllable one-way coupling devices (e.g., a one-way dynamic controllable clutch, which may be referred to as a DCC) to achieve shifting between the two available gears and the reduction sets formed by the gears. One example includes a transmission that utilizes a two speed automatic transmission. The transmission may utilize at least two one-way dynamic controllable clutches and a two gear sets. The gear sets may be formed of a gear pair. The gear sets are in mesh contributing to two ratios. There is at least a first gear set and a second gear set. The first gear set and a second gear set may drivingly couple at least two shafts. A first shaft may be selectively coupled to the first gear set via a first dynamic one-way controllable clutch. A second shaft, that may be parallel to the first shaft, may be selectively coupled to the second gear set, opposite to the first gear set, via a second dynamic one-way controllable clutch. The two gear sets are acted on by the input of the transmission mechanically and drivingly coupled to an electric machine acting as a mover to output of the transmission connected to the driven wheels of the vehicle.

The use of dynamic one-way controllable clutches may increase the tolerances, and therein lower the precision of controls for completing the locking the one-way clutch, for upshifting and downshifting in a two speed transmission. The use of one-way controllable clutches may decrease inefficiencies of rotational energy transfer and reduce clutch drag compared to using a two speed transmission with an arrangement of friction clutches for shifting between reduction sets of different ratios. Additionally, dynamic one-way controllable clutches may be more tolerant to variations in temperature and thermal energy compared to friction clutches.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
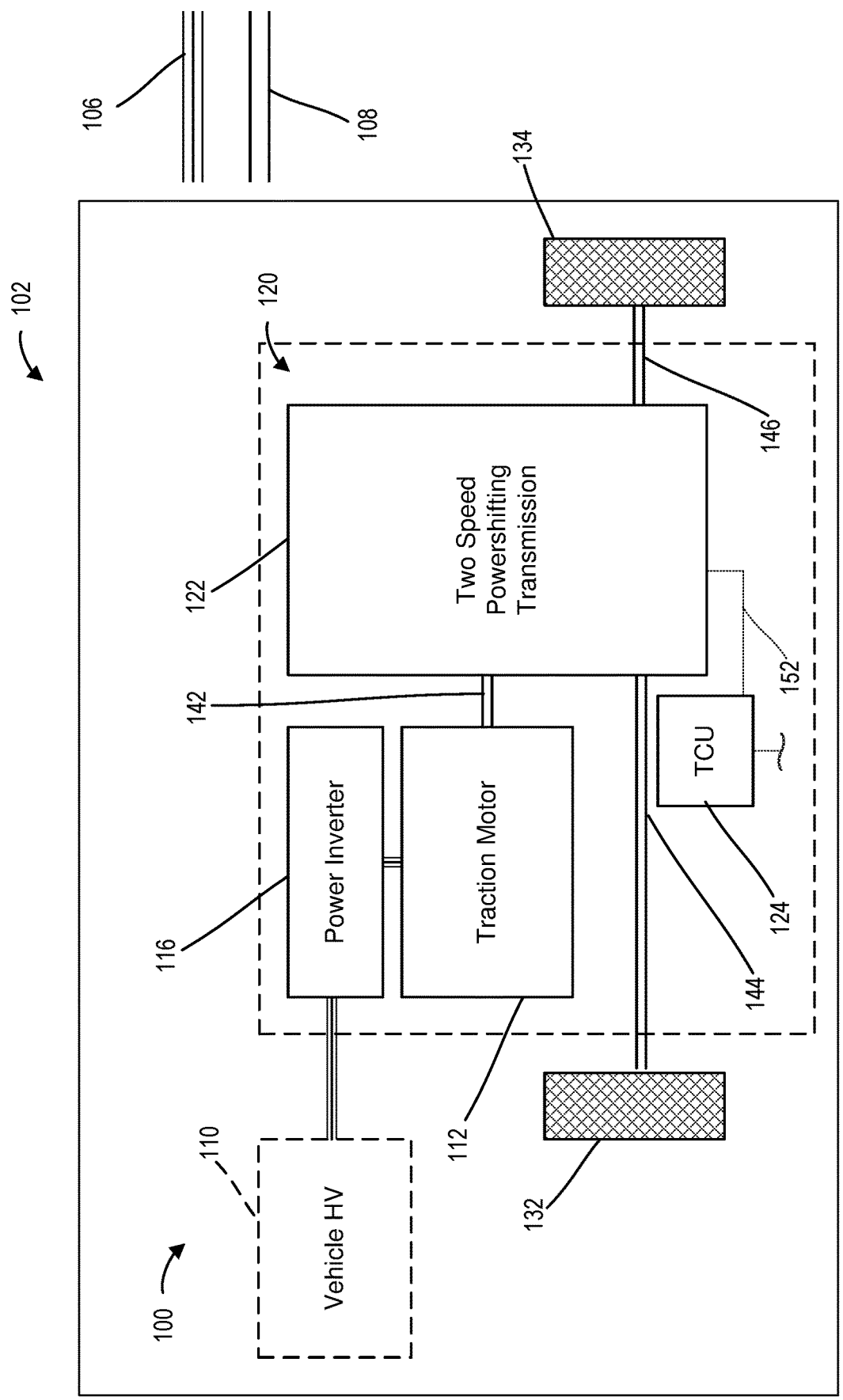
FIG. 1 shows a schematic of a transmission portion of a driveline system.

The following description relates to a transmission that may be an automatic transmission. The transmission may be at least a two speed transmission that may incorporate at least two reduction sets. Each reduction set may drivingly couple at least two shafts. When components are drivingly coupled, for example, a torque to a first component may drive a second component and vice versa. The reduction sets may be gear sets. Each reduction set may be of a ratio of a different effective distance, such that each reduction set may produce different rotational speed and torque outputs for the transmission. Each of the reduction sets may selectively couple to at least one shaft via a disconnect device, such as a clutch. When selectively coupled, a component may be coupled and decoupled, for example a disconnect devices may close to couple and open to decouple a first component and a second component that selectively couple. There may be at least two disconnect devices, e.g., two clutches, one for each reduction set. Each of the disconnect devices may be a one-way clutch, such as a dynamically controllable one-way coupling device also known as a dynamically controllable clutch (dynamic controllable clutch, or DCC). The disconnect devices may be used to increase the speed of rotation, e.g., rotation per minute (RPM), of an output element up to the same speed as a rotating element. A DCC may absorb the change of kinetic energy of the non-rotating element. The rotating element may be an input element and the stationary element may be an output element.

The one-way clutch may have a plurality of locking modes. As a DCC clutch, the one-way clutch may have three discreet states that may be controlled using electromechanical means. These discrete states may be incorporated into modes that may allow for torque transfer or disengagement from the input to the output. Each DCC clutch may have three discreet states: a first state, a second state, and a third state. The discrete states may include a fully locked state, a one-way (one way) clutch state, and a fully open state. The first state may be the fully locked state, the second state may be the one-way clutch state, and the third state may be the fully open state. The fully locked state may be an engaged state, wherein the clutch may be engaged such that the input and output of the clutch may rotate in the same direction and torque may be transferred via rotation in a first direction or a second direction, where the first direction is opposite to the second direction. The fully open state may be a disengaged state, wherein the clutch is fully disengaged, such that the input and output of the clutch may rotate freely and torque may not be transferred via rotation in the first direction or the second direction. The one-way clutch state may be a partially engaged state, where the input and the output may rotate together in the first direction but not the second direction, and the input and output may transfer torque when rotated in the first direction but not transfer torque when rotated in the second direction. The fully locked state may additionally and alternatively be referred to herein as a fully engaged state or an engaged state. The fully open state may additionally or alternatively be referred to as a fully disengaged state or a disengaged state.

A first one-way clutch may work in conjunction with a second one-way clutch, both of which may be DCC clutches. The first one-way clutch may be used to engage with a reduction set, such as a first reduction set. The second one-way clutch may be used to engage with another reduction set, such as a second reduction set. To switch to engaging the second reduction set from the first reduction set, the first one-way clutch of the first reduction set may be disengaged and second one-way clutch of the second reduction set may be partially engaged in a one-way (one-way or OWC) mode. When the input and output shafts are adjusted to approximately the same rotational speed, the second one-way clutch may then be fully engaged in a locked mode. The engagement of the first one-way clutch and second one-way clutch may be coordinated via plurality of microcontrollers part of a control system.

Figure 2:
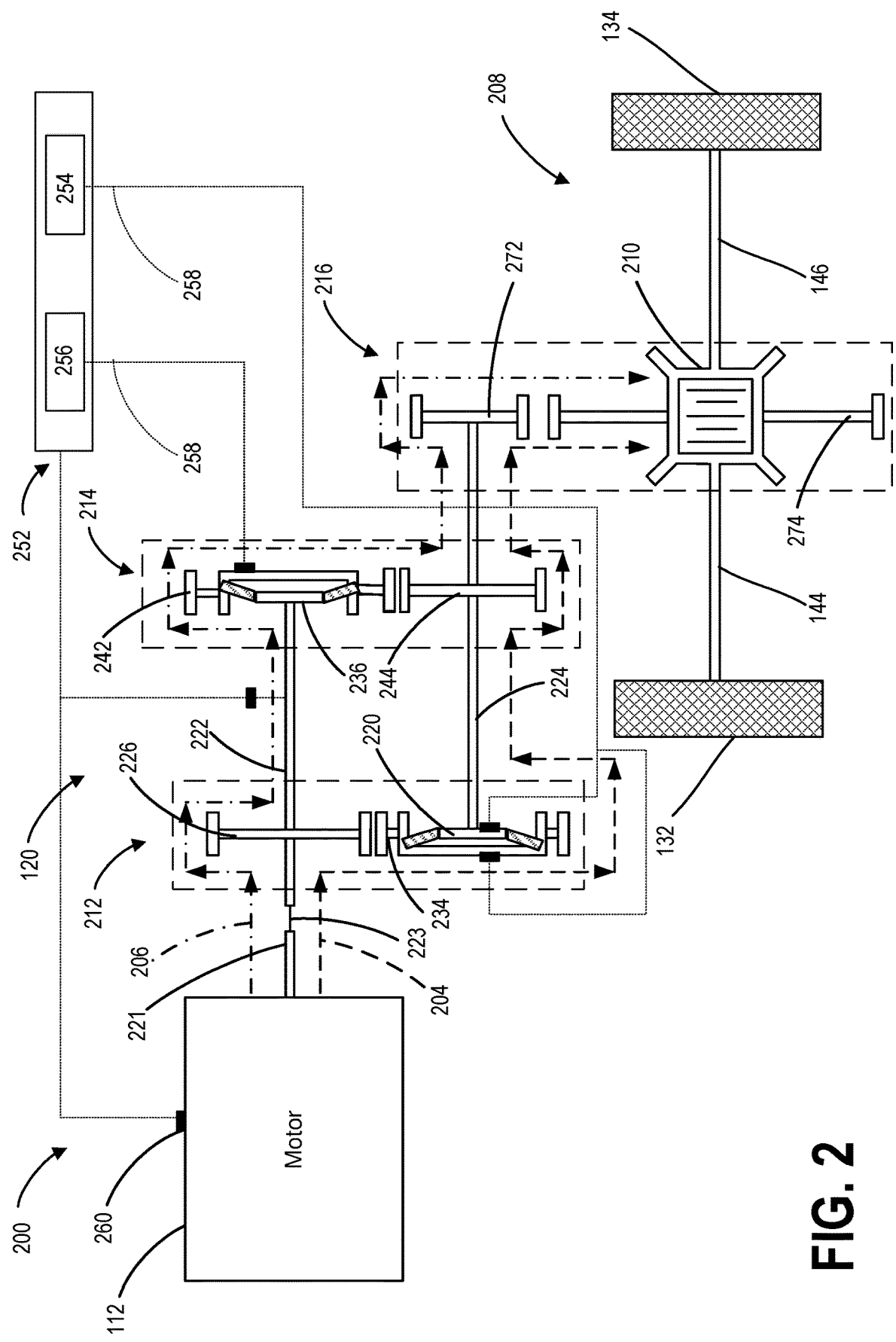
FIG. 2 shows a schematic of the transmission, an axle the transmission acts upon, and a motor with torque flows that act upon the transmission.
Figure 3A:
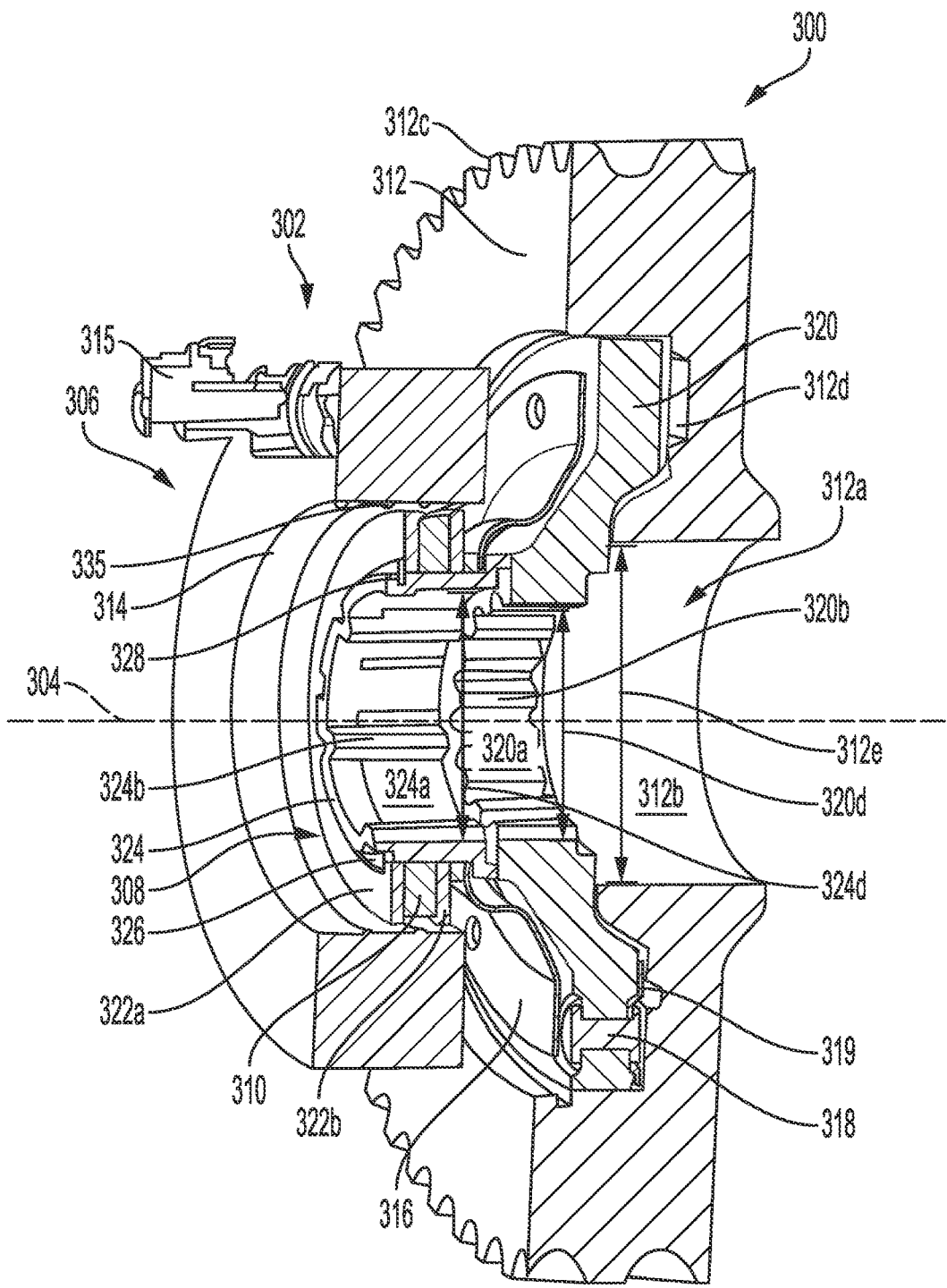
FIG. 3A shows an embodiment of the one-way dynamic clutch and the components.
Figure 3B:
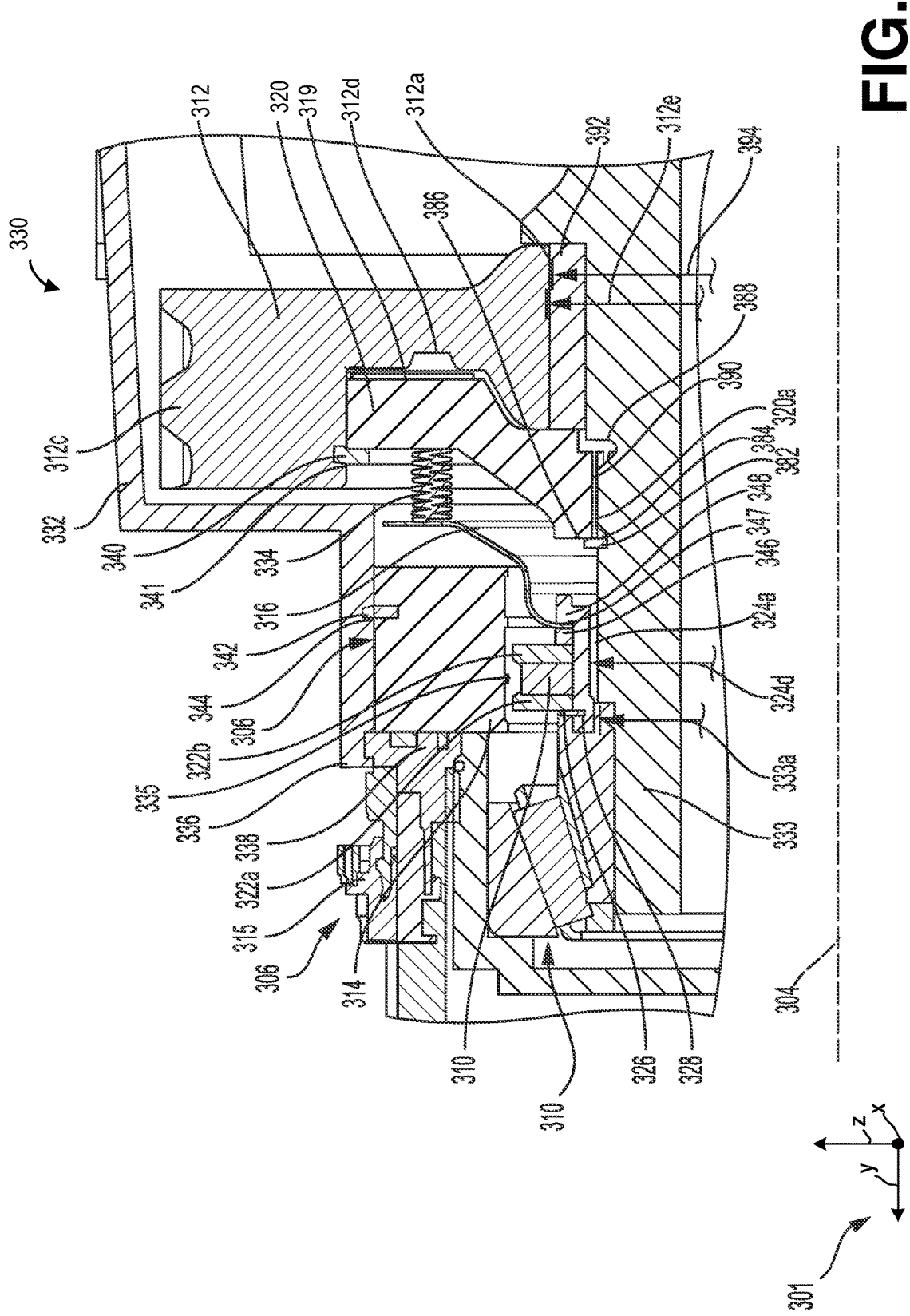
FIG. 3B shows an embodiment of the one-way dynamic clutch assembled and coupled to the transmission.
Figure 4:
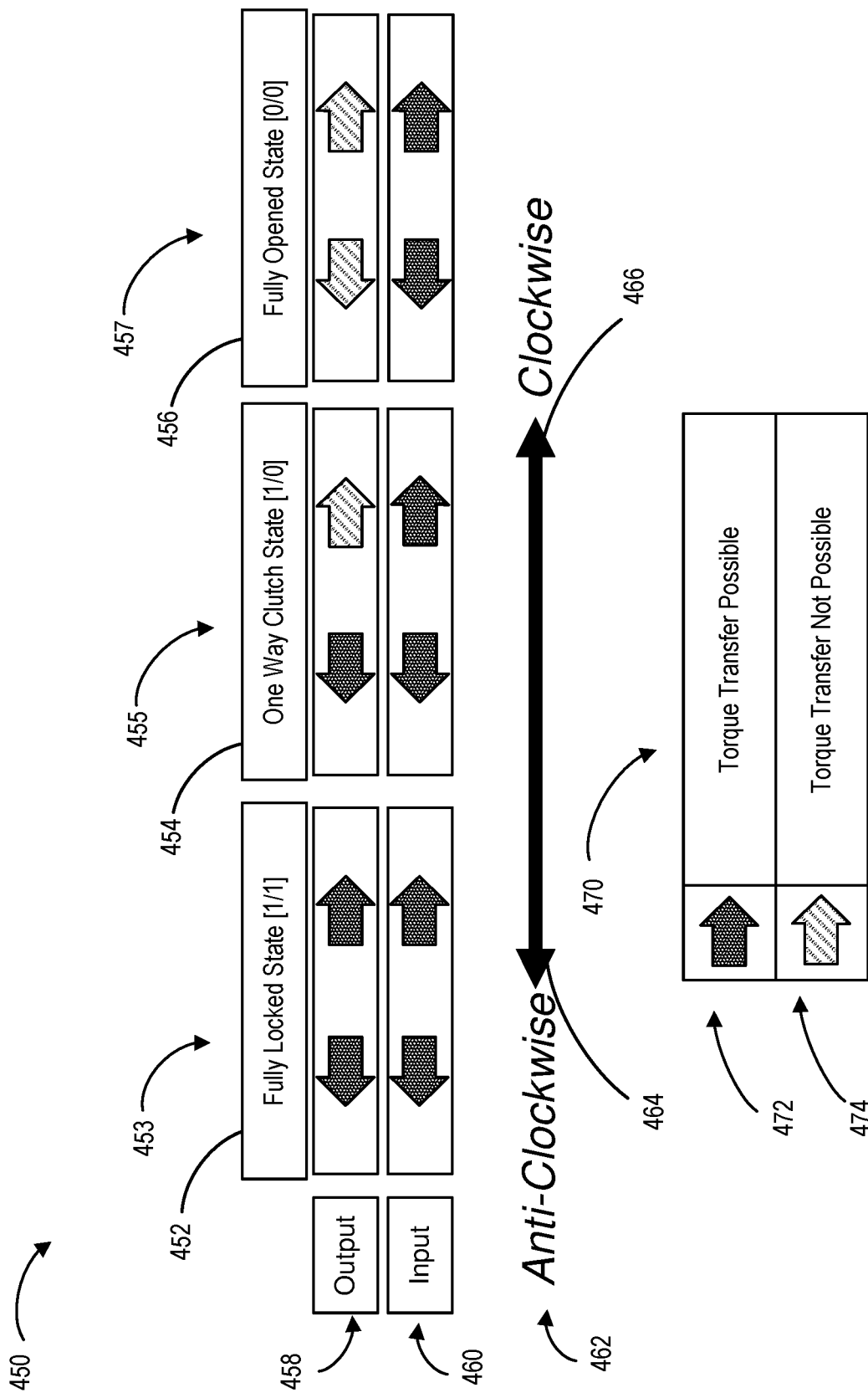
FIG. 4 shows a table of different modes of the dynamic clutch when locked, one way, and open.
Figure 5:
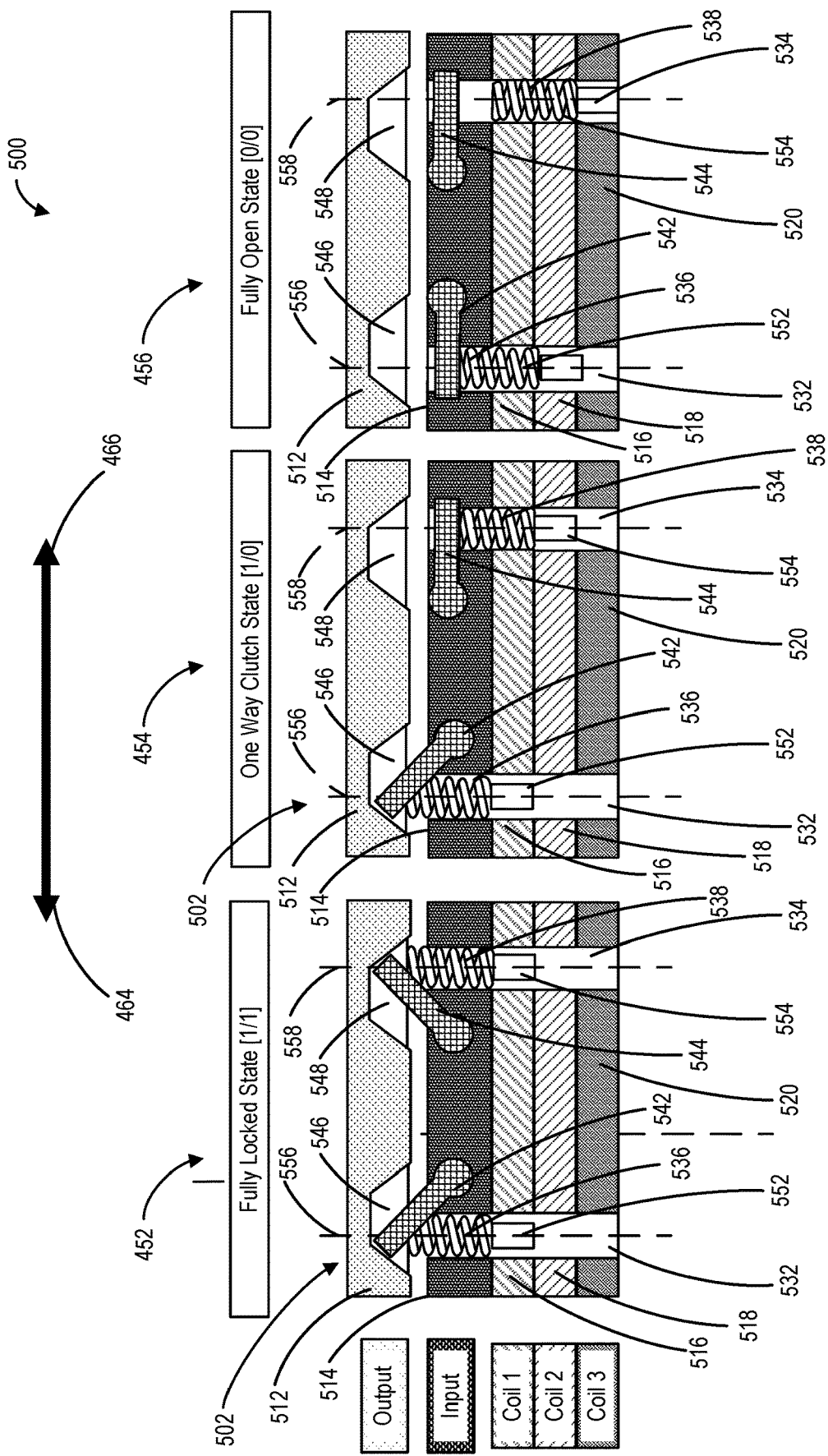
FIG. 5 shows a schematic of the engagement of components of the dynamic controllable clutch in different modes.
Figure 6:
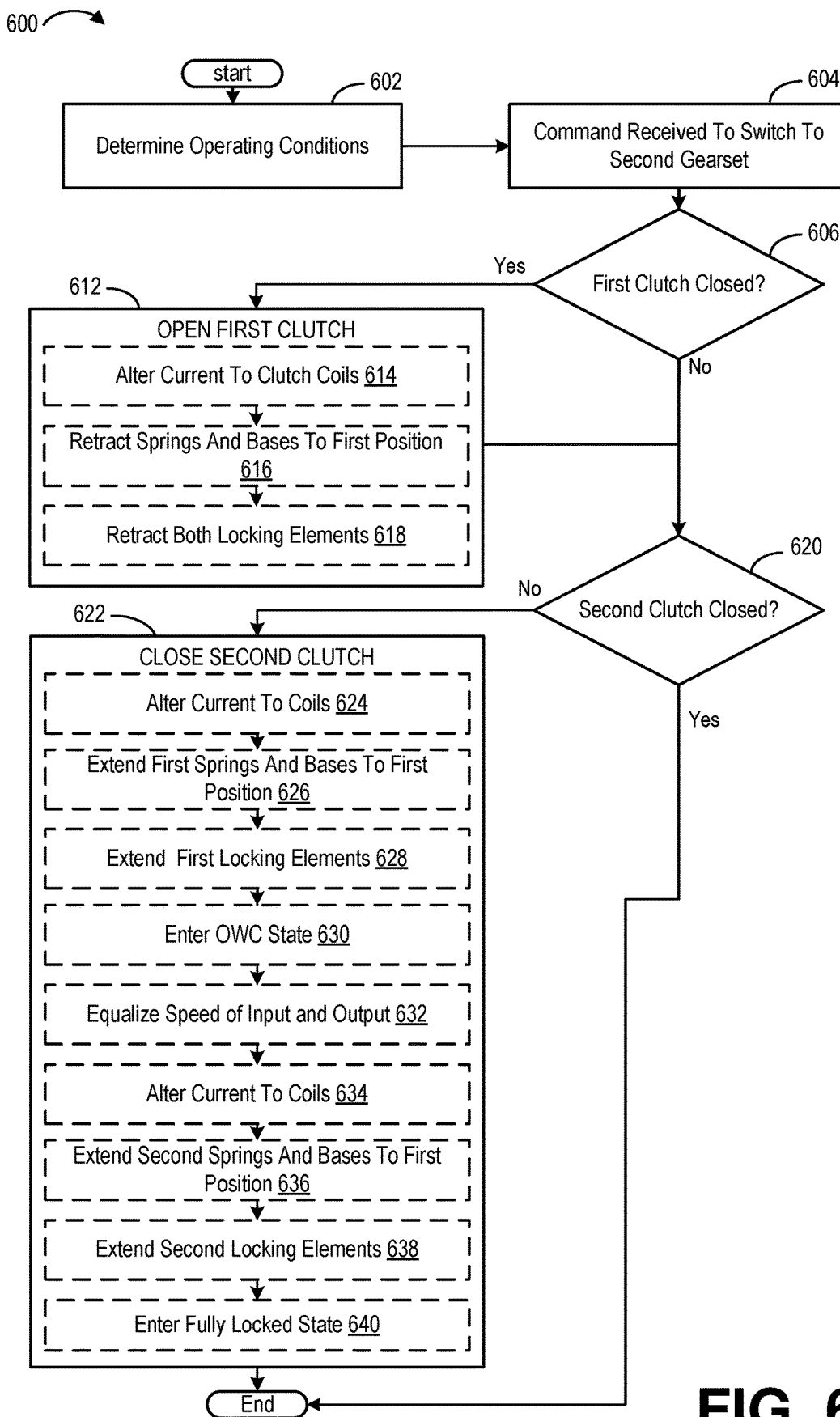
FIG. 6 shows a flow chart of a method for shifting a pair of dynamic controllable clutch between different modes to shift gears.

FIG. 1 shows a schematic of a transmission portion of a driveline system including the components, such as the battery, power inverter, and electric machine, that act upon the transmission. The vehicle of FIG. 1 may be a hybrid or an EV powered vehicle with an electric machine. The transmission of the vehicle of FIG. 1 may incorporate a differential. FIG. 2 shows a schematic of the components of a transmission of FIG. 1 the transmission inputs and the transmission outputs. The transmission may be a two speed transmission with at least two reduction sets of different ratios that output different rotational speeds and torques. The reduction sets may be coupled via two one-way clutches that may be DCC clutches. FIG. 2 shows a plurality of controllers used to engage and disengage the first one-way clutch and the second one-way clutch. FIG. 3A shows an exploded view of a one-way dynamic controllable clutch that has been sectioned. FIG. 3B shows sectional view of the one-way dynamic controllable clutch when assembled and coupled to the transmission of FIG. 2. The one-way dynamic clutch of FIGS. 3A-3B may be used as the one-way clutches in the schematic of FIG. 2, and be capable of operating in an engaged state or a one-way clutch state. FIG. 4 shows a table of different modes of the dynamic clutch such as during a locked mode, a one-way (one way) clutch (OWC) mode, and an open mode. FIG. 5 shows a schematic of the engagement of components of the dynamic controllable clutch in different modes between the input and output of the clutch. FIG. 5 shows how a first locking element and second locking element may be adjusted during the locked mode, the one-way clutch (OWC) mode, and the open mode of FIG. 4. FIG. 6 shows a schematic of the engagement of components of the dynamic controllable clutch in different modes. FIG. 6 shows a flow chart of a method for shifting a pair of dynamic controllable clutch between different modes to shift gears. The method of FIG. 6 shows the closing of a first clutch opening and opening of a second clutch during the gear shift. The method of FIG. 6 may be applicable to upshifting or downshifting.

FIGS. 1-2 and FIGS. 4-5 show schematics of example configurations with relative positioning of the various components. FIGS. 3A-3B show example configurations with approximate positions. FIGS. 3A-3B are shown approximately to scale though other relative dimensions may be used. As used herein, the terms "approximately" is construed to mean plus or minus five percent of the range unless otherwise specified.

Further, FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 1, an example schematic of a power system 100 is shown part of a vehicle 102. The power system 100 is comprised of a battery 110, an electric machine 112, a power inverter 116, and a transmission system 120. The transmission system 120 may comprise a transmission 122 and components drivingly coupled to the transmission 122. Components of the power system 100 may be electrically coupled via a plurality of electrical interfaces 106. Electrical interfaces 106 may be represented by a thicker line between two thinner lines that are parallel. Components of the power system 100 may be drivingly coupled via a plurality of torsional interfaces 108. Torsional interfaces 108 may deliver mechanical energy via torque and be represented as two parallel lines.

The battery 110 supplies the components of the power system 100 with energy in the form of electrical energy. The battery 110 may be a high voltage (HV) battery. The battery 110 may deliver electricity to drive the electric machine 112. The electric machine 112 may act as the prime mover generating mechanical power for the transmission 122 and power system 100. The electric machine 112 may also act as a generator and generate electrical energy for other components in the power system 100. The power inverter 116 may convert direct current (DC) from the battery 110 into alternating current (AC) for the electric machine 112. Energy from the battery 110, the power and rotation of the electric machine 112, and conditions such as the frequency of the alternating current in the power inverter 116, may be governed by a controller. The controller may receive data from a plurality of sensors in and alter the conditions of the battery 110, electric machine 112, power inverter 116, and transmission system 120.

The transmission system 120 distributes mechanical energy from the electric machine 112 to drive a first wheel 132 and a second wheel 134 to propel the vehicle 102 in a direction. The transmission system 120 may be formed of the transmission 122, as well as other components, such as a transmission control unit (TCU) 124, a hydraulic shifting system, an electronic pump, and a differential. The differential may be an electronic limited slip differential (eLSD). The transmission 122 may increase the torque or speed provided by the electric machine 112 to the first wheel 132 and second wheel 134. The transmission 122 distributes mechanical energy to the first wheel 132 and the second wheel 134 via a differential. The differential may be incorporated into the transmission 122. Alternatively, a differential may be separate from but drivingly coupled to the transmission 122. The TCU of the transmission 122 may change settings of the transmission system 120 based on internal conditions of the transmission system 120 recorded by a plurality of sensor and or commands from the operator or user of vehicle 102. The TCU of the transmission 122 may communicate with the controller to receive commands from the operator or user of the vehicle 102 and/or change settings in components outside of the transmission system 120 such as the electric machine 112.

The electric machine 112 may distribute a torque via a motor torque output 142 to the transmission 122. The motor torque output 142 may be a torsional interface 108. The transmission 122 distributes mechanical energy of the transmission into a first torque output 144 to the first wheel 132 and a second torque output 146 to the second wheel 134. The torques distributed by the first torque output 144 and second torque output 146 may be approximately the same, for example, when the vehicle 102 is moving linearly along a longitudinal axis in a forward or reverse direction. The torques distributed by the first torque output 144 and the second torque output 146 may be different, for example, when the vehicle 102 is turning.

The TCU 124 may be communicatively coupled with the transmission 122 and components and features of the transmission 122. The TCU 124 may be communicatively coupled to components via a plurality of communicative couplings 152. Each of the communicative couplings 152 may be represented by a dotted line. When communicatively coupled, the TCU 124 may receive data signals from a component, such as a sensor. Likewise, when communicatively coupled, the TCU 124 may send command signals to a component, such as an actuator. The TCU 124 may be communicatively coupled to other components in the transmission system 120 as well as other components beyond the transmission system 120. The TCU 124 may be communicatively coupled to other components and features of a control system of the vehicle 102.

Turning to FIG. 2, a schematic of a transmission motor system 200 is shown part of a vehicle 102. The transmission motor system 200 is formed of the electric machine 112, the transmission 122, and the first and second wheels 132, 134.

The electric machine 112 provides the transmission 122 with rotational energy via torque. Rotational energy may be transferred through the transmission 122 via a first torque flow 204 and a second torque flow 206. The first and second torque flows 204, 206 may be distributed to the first torque output 144 and the first wheel 132 and the second torque output 146 and the second wheel 134 by a differential 210. The differential 210 may be incorporated as a component of the transmission 122 and a part of an axle 208. The differential 210 may be electronic differential, such as an eLSD. The differential 210 may be drivingly coupled to the first wheel 132 via the first torque output 144 and to the second wheel 134 via the second torque output 146.

At least two shafts formed from the axle 208 may drivingly couple to the differential 210. A first shaft of the axle may be first torque output 144. A second shaft of the axle may be may be second torque output 146.

The transmission 122 forms a plurality of reduction sets. For example, the transmission 122 may be formed of at least a first reduction set 212, a second reduction set 214, a third reduction set 216, wherein each reduction set is enclosed by a box formed of dashed lines. The first reduction set 212, the second reduction set 214, the third reduction set 216 may be of different ratios. The first reduction set 212 may be of a first ratio. The second reduction set 214 may be of a second ratio. The first reduction set 212 and second reduction set 214 may be supported by, span, and drivingly couple a first shaft 222 and a second shaft 224. The third reduction set 216 may act as a third ratio and final drive ratio drivingly coupled to the differential 210. The third reduction set 216 may span and be supported by second shaft 224 and differential 210.

The first reduction set 212 may generate a different output speed and torque to a shaft, such as the second shaft 224, compared to the second reduction set 214. For an example of one configuration, the first reduction set 212 may be of a first ratio and the second reduction set 214 may be of a second ratio. For this example, the second ratio of the second reduction set 214 may have a greater effective diameter than the first ratio of the first reduction set 212. The second reduction set 214 may transfer a greater torque and lower rotational speed to the second shaft 224 compared to the first reduction set 212. However, it is to be appreciated that the arrangement of the ratios with larger and smaller effective diameters are non-limiting. In an alternate example embodiment, the effective diameter and ratio of the first reduction set 212 may be greater than the second reduction set 214.

The first shaft 222 may act as an input shaft for the first and second reduction sets 212, 214. The first shaft 222 may be formed from or drivingly coupled to a motor shaft 221, where the motor shaft 221 is the output of or is drivingly coupled to the output of electric machine 112. For example, the motor shaft 221 may rotationally couple the first shaft 222, such that the motor shaft 221 and first shaft 222 may rotate as a single shaft. Coupling between the motor shaft 221 and first shaft 222 may be represented by a line 223. The second shaft 224 may act as an output, such as an output shaft, for the first and second reduction sets 212, 214. The second shaft 224 may be an output from the transmission, and may output torque to the wheels of a vehicle, such as the first wheel 132 or the second wheel 134 of the vehicle 102.

The transmission 122 has at least two clutches. The at least two clutches of the transmission are dynamic controllable clutches (DCCs), including a first DCC and a second DCC. The transmission 122 may have at least a dynamic selectable one-way clutch, where at least the first DCC or the second DCC is a selectable one-way clutch. Additionally, both the first DCC and the second DCC may be selectable one-way clutches. The transmission 122 has two clutches in the form of a first one-way clutch 220 and a second one-way clutch 236. The first and second one-way clutches 220, 236 may be dynamic selectable one-way clutches, where the first one-way clutch 220 may be the first DCC and the second one-way clutch 236 may be the second DCC. The first one-way clutch 220 may be a component of the first reduction set 212, and the second one-way clutch 236 may be a component of the second reduction set 214.

The first one-way clutch 220 may drivingly couple the second shaft 224 to the first reduction set 212. When in an engaged state, the first one-way clutch 220 may selectively and drivingly couple the second shaft 224 to the first reduction set 212. When in the engaged state, the first one-way clutch 220 may rigidly couple the second shaft 224 to a complementary rotational element of the first reduction set 212. When drivingly coupled to the second shaft 224, the first reduction set 212 may transfer torque between the first shaft 222 and the second shaft 224. The first input and the first output may be rotationally coupled to transfer torque when selectively coupled via the first one-way clutch 220. For an example, the input of the first one-way clutch 220 may drivingly and rotationally couple the second shaft 224. For this example, the output of the first one-way clutch 220 may drivingly and rotationally couple to the complementary rotational element of the first reduction set 212.

The second one-way clutch 236 may drivingly couple the first shaft 222 to the second reduction set 214. When in an engaged state, the second one-way clutch 236 may selectively and drivingly couple the first shaft 222 to the second reduction set 214. When in the engaged state, the second one-way clutch 236 may rigidly couple the first shaft 222 to a complementary rotational element of the second reduction set 214. When drivingly coupled to the first shaft 222, the second reduction set 214 may transfer torque between the first shaft 222 and the second shaft 224. If the second one-way clutch 236 is not selectively coupling the first reduction set 212 to the first shaft 222, the torque may not be transferred via the second reduction set 214 to the second shaft 224. If the second one-way clutch 236 is not selectively and drivingly coupling the second reduction set 214 to the first shaft 222, torque may not be transferred to the second shaft 224 via the second reduction set 214. The second one-way clutch 236 may have a second input and a second output. For the second one-way clutch 236, the second input and the second output may selectively couple, such that the second input be shifted toward and rotationally couple to the second output when engaged. The second input and the second output may be rotationally coupled to transfer torque when selectively coupled via the second one-way clutch 236. For an example, the input of the second one-way clutch 236 may drivingly and rotationally couple the first shaft 222. For this example, the output of the second one-way clutch 236 may drivingly and rotationally couple the complementary rotational element of the second reduction set 214.

For the example in the transmission motor system 200, the transmission 122 may be in at least two modes: a first setting, referred to herein as first gear, or a second setting, referred to herein as second gear. First gear and second gear may be additionally or alternatively referred to as a first speed and a second speed, respectively. In one example, the transmission 122 may be engaged with a reduction set of a higher ratio in second gear than in first gear. In one example, in first gear, the first reduction set 212 may drivingly couple the first and second shafts 222, 224. In first gear, the first one-way clutch 220 may selectively couple the second shaft 224 to the first reduction set 212. When selectively coupled via the first one-way clutch 220, the complementary rotational element of the first reduction set 212 may drivingly and rigidly couple to the second shaft 224. When the first one-way clutch 220 drivingly couples the second shaft 224 and the first reduction set 212, rotational energy and torque of electric machine 112 may follow the first torque flow 204. In second gear, the second reduction set 214 may drivingly couple the first and second shafts 222, 224. When selectively coupled via the second one-way clutch 236, the complementary rotational element of the second reduction set 214 may rigidly couple the first shaft 222. When the second one-way clutch 236 drivingly couples the first shaft 222 and the second reduction set 214, the rotational energy and torque of electric machine 112 may follow the second torque flow 206.

The first reduction set 212 and second reduction set 214 may each be formed of at least two reducers, such as gears. At least one of the reducers of the first reduction set 212 may be the complementary rotational element that may be selectively, drivingly, and rigidly couple to the second shaft 224 via the first one-way clutch 220. At least one of the reducers of the second reduction set 214 may be the complementary rotational element that may be selectively, drivingly, and rigidly couple to the first shaft 222 via the second one-way clutch 236. The first reduction set 212 may be formed of a first gear 226 and a second gear 234, wherein the first gear 226 and second gear 234 may mesh. The second reduction set 214 may be formed of a third gear 242 and a fourth gear 244, wherein the third gear 242 and a fourth gear 244 may mesh. For an example of one configuration, the third reduction set 216 may be formed of a fifth gear 272 and a sixth gear 274, wherein the fifth gear 272 and sixth gear 274 may mesh.

The first gear 226 and third gear 242 may be drivingly coupled to the first shaft 222. The second gear 234 and fourth gear 244 may be drivingly coupled to the second shaft 224. The second gear 234 may be the complementary rotational element of the first reduction set 212, where the second gear 234 may be selectively coupled to the second shaft 224 via the first one-way clutch 220. The third gear 242 may be the complementary rotational element of the second reduction set 214, where the third gear 242 may be selectively coupled to the first shaft 222 via the second one-way clutch 236. The first gear 226 and third gear 242 may each act as a driven gear for the first reduction set 212 and second reduction set 214, respectively. The second gear 234 and fourth gear 244 may each act as a driving gear for the first reduction set 212 and second reduction set 214, respectively. The fifth gear 272 may act as the driving gear and the first gear for the third reduction set 216. The fifth gear 272 may be drivingly coupled to the second shaft 224. The sixth gear 274 may be drivingly coupled to the differential 210.

The engagement of first one-way clutch 220 and second one-way clutch 236 may be governed by a control system 252. The control system 252 may be formed a plurality of controllers. For one example, the first one-way clutch 220 may be controlled by and communicatively coupled to a first controller 254. The second one-way clutch 236 may be controlled by and communicatively coupled to a second controller 256. Communicative coupling may be represented by a plurality of dashed lines 258. The first controller 254 and second controller 256 may be microcontrollers. The first controller 254 and second controller 256 may be communicatively coupled such that the first one-way clutch 220 or second one-way clutch 236 may disengage when the other clutch receives a signal to engage. The control system 252 may be communicatively coupled to a plurality of sensors 260. A sensor of the sensors 260 may be represented by a black rectangle. The sensors 260 may be rotational speed sensors that may measure the rotational speeds of complementary component. Components that may have conditions, such as rotational speed, monitored by and are complementary to the sensors 260 include the electric machine 112, where one or more of the sensors 260 may monitor the rotational speed of the output and/or the rotor of electric machine 112; the first shaft 222; the second shaft 224; the first one-way clutch 220; the second one-way clutch 236; and/or the third gear 242.

The first and second one-way clutches 220, 236 may be dynamic controllable clutches (DCC). As a first example of DCC clutches, the first and second one-way clutches 220, 236 may control to at least three states, including a fully engaged state, a one-way (one way) clutch state, and a fully disengaged state. During the fully engaged state, the first and second one-way clutches 220, 236 may have their respective inputs and outputs of the clutches rotationally coupled. When fully engaged, the inputs and the outputs to the first and/or second one-way clutches 220, 236 may be driven in the same direction, and torque between when the input and output when either are driven to rotate in first direction or a second direction, where the first direction is opposite the second direction. During the fully disengaged/open state for the first and/or second one-way clutches 220, 236, the respective inputs and the outputs of clutches may be completely disengaged. When completely disengaged, the inputs and outputs of the first and/or second one-way clutches 220, 236 may rotate freely, and torque may not be transferred between the inputs and outputs via rotation in the first direction or the second direction. The fully disengaged state may be alternatively referred to as a completely disengaged state. During the one-way clutch state for the first and second one-way clutches 220, 236, the respective inputs and outputs may be a partially engaged state, where the respective inputs and outputs may rotate together in the first direction but not the second direction. Torque may be transferred between the input and the output when rotated in the first direction, but not when rotated in the second direction for the first and second one-way clutches 220, 236 in the one-way clutch state.

As DCC clutches, the first and second one-way clutches 220, 236 may be electromagnetically operated. Electromagnetic actuators specific to each of the first and second one-way clutches 220, 236 may change the states of the first and second one-way clutches 220, 236 between the first state, the second state, and the third state described above. The electromagnetic actuators of the first and second one-way clutches 220, 236 are electrically coupled and supplied with power via a full bridge inverter. Full bridge inverter is a topology of H-bridge inverter and may be used for converting direct current (DC) power into alternating current (AC) power. The circuit of a full bridge inverter may include four diodes and four switches. The first and second controllers 254, 256 and the control system 252 are full bridge controllers and a full bridge control system, respectively. As full bridge controllers, the first and second controllers 254, 256 may operate two switches of the full bridge inverters. The first controller 254 may operate two switches of the four switches at a time for the full bridge inverter supplying power to the actuator of the first one-way clutch 220. The second controller 256 may operate two switches of the four switches at a time for the full bridge inverter supplying power to the actuator of the second one-way clutch 236. Altering the conditions of the current via the full bridge inverters specific to the first and second one-way clutches 220, 236 may alter the state of the first and second one-way clutches 220, 236, respectively For example, the first controller 254 may engage first one-way clutch 220 to drivingly couple the second shaft 224 to the first reduction set 212. The first controller 254 may communicate with the second controller 256 to disengage the second one-way clutch 236 to the fully disengaged state. The second controller 256 may send a signal to disengage the second one-way clutch 236 from the second reduction ratio in a controlled manner. Simultaneously the first controller 254 may send a signal to change the position of the first one-way clutch 220 to be in a one-way clutch state with the second shaft 224. When the first and second shafts 222, 224 are adjusted to the same rotational speed, the first one-way clutch 220 may be controlled to a fully engaged state. If the second controller 256 engages the second one-way clutch 236 to drivingly couple first shaft 222 to the second reduction set 214, the second controller 256 may communicate with the first controller 254 and the sequence described above may be completed in a reverse manner.

As DCC clutches, first and second one-way clutches 220, 236 may be engaged in the one-way clutch state during the speed synchronization phase of shifting. The one-way clutch state is the partially engaged state. Engaging in the one-way clutch state allows the first and second one-way clutches 220, 236 to passively engage and prevent overshooting the speed match. The automatic passive mechanical alignment increases the tolerance for locking the first and second one-way clutches 220, 236 compared to a claw clutches that have lower tolerances for alignment and locking to avoid tooth on tooth engagements. The engagement of the first and second one-way clutches 220, 236 increases case of control and allows more aggressive speed matching, compared to claw clutches, resulting in fast and reliable shifts, such as upshifts and downshifts.

Alternatively, a single controller may be used for the role of the first controller 254 and second controller 256. The single controller, may be a TCU, such as the TCU 124 of FIG. 1. Additionally, the number of controllers may be non-limiting, and there may be a plurality of controllers used in conjunction with the first controller 254 and second controller 256 to engage and disengage the first and second one-way clutches 220, 236, respectively. A TCU, such as the TCU 124, may be part of the control system 252, or the TCU may include the control system 252. The first controller 254 and second controller 256 may be communicatively coupled to the TCU. Alternatively, the first controller 254 and second controller 256 may be part of the TCU.

The first and second torque flows 204, 206 may start from an output of the electric machine 112 and transfer to the first reduction set 212 or a second reduction set 214, respectively. The output of the electric machine 112 may be or may rotationally couple to the motor shaft 221. The motor shaft 221 may be formed from or drivingly coupled to the first shaft 222. The first and second torque flows 204, 206 may be transferred to the first and second reduction sets 212, 214 via the first shaft 222.

The first torque flow 204 may occur when the first one-way clutch 220 is engaged (e.g., locked) to the second gear 234. The first one-way clutch 220 may be engaged when in a fully engaged state or a one-way clutch state. The first one-way clutch 220 may lock and couple with the second gear 234, and therein drivingly coupling the second shaft 224 to the second gear 234. Torque transferred from the first gear 226 to the second gear 234 may then be transferred into and drive the second shaft 224 to rotate.

The second torque flow 206 may occur when the second one-way clutch 236 is engaged (e.g., locked) to the third gear 242. The second one-way clutch 236 may be engaged when in a fully engaged state or a one-way clutch state. The second one-way clutch 236 may lock and couple with third gear 242. The third gear 242 may be forced to rotate, and transfer torque into and drive the fourth gear 244. The fourth gear 244 may force and drive the second shaft 224 to rotate.

The first torque flow 204 may transfer torque into and affect the rotation of the first reduction set 212. The first torque flow 204 may rotate the first gear 226 via the spinning of the first shaft 222. The first gear 226 may act as a drive gear and transfer the torque to the second gear 234. The second gear 234 may act as a driven gear for the first reduction set 212. The second gear 234 may drivingly couple and lock with the first one-way clutch 220. The first torque flow 204 continues through the output of the second gear 234 and first one-way clutch 220 through the second shaft 224. The second shaft 224 may transfer torque and rotate the fourth gear 244 and the fifth gear 272. When the first shaft 222 is not coupled to the second one-way clutch 236, the third gear 242 and fourth gear 244 may rotate freely about the first and second shafts 222, 224, respectively. The first shaft 222 may also freely rotate and not transfer rotational energy to the third gear 242.

The second torque flow 206 may transfer torque into and affect the second reduction set 214 via first shaft 222 and second one-way clutch 236. The first shaft 222 may be drivingly coupled to the third gear 242 via the second one-way clutch 236. The second torque flow 206 may force the first and third gears 226, 242 to rotate. The third gear 242 may be drivingly coupled to and drive the fourth gear 244. When the fourth gear 244 is driven, the second torque flow 206 may transfer rotational energy from the third gear 242 to the fourth gear 244. The fourth gear 244 may transfer rotational energy to drive and rotate the second shaft 224. Likewise, the first gear 226 may force the second gear 234 to rotate. The second gear 234 may be decoupled from the first one-way clutch 220 and second shaft 224, and therein the first and second gears 226, 234 may rotate freely and not transfer torque to the second shaft 224. The second shaft 224 may also freely rotate under the torque transferred from the fourth gear 244 and not transfer rotational energy to the second gear 234.

The first and second torque flows 204, 206 may transfer rotational energy from the second shaft 224 to the third reduction set 216. Rotational energy may be first transferred to the fifth gear 272 from the second shaft 224. The first and second torque flows 204, 206 may transfer rotational energy between the fifth gear 272 to the sixth gear 274, wherein the fifth gear 272 drives the sixth gear 274. The sixth gear 274 may be drivingly coupled and transfer the rotational energy from the first and second torque flows 204, 206 to the differential 210. The differential 210 may distribute torque from the first torque flow 204 and second torque flow 206 to the first and second wheels 132, 134 of the vehicle 102. The first and/or second torque flows 204, 206 may be divided into the first torque output 144 for the first wheel 132 and a second torque output 146 for the second wheel 134 from the differential 210.

The transmission motor system 200 may implement various selectable one-way clutches, such as the first or second one-way clutch 220, 236. For one example, the first and/or second one-way clutches 220, 236 may be a three position one-way clutch, having three discrete modes. Configured as three position one-way clutches, the first and/or second one-way clutches 220, 236 may be in a locked mode, a partially locked mode, and an open mode. The locked mode, a partially locked mode, and an open mode which may correspond to the locked state, the one-way clutch state, and the fully open state, respectively, described above. When in the locked mode, the first and second one-way clutches 220, 236 may be in the engaged state. The partially locked mode may be a one-way clutch mode, where the first and second one-way clutches 220, 236 may be in the one-way clutch state. The engaged state may be the fully engaged state. The fully open state may be the fully disengaged state. When in the locked mode, the first and second one-way clutches 220, 236 may be in the locked state. The partially locked mode may be a one-way clutch mode, where the first and second one-way clutches 220, 236 may be in the one-way clutch state. When in the open mode, the first and second one-way clutches 220, 236 may be in the disengaged state.

The incorporation of the first one-way clutch 220 and second one-way clutch 236 as DCC clutches, may allow for upshifting and downshifting operations in the transmission motor system 200. For an example configuration of transmission motor system 200, during downshifting, the first one-way clutch 220 may engage and the second one-way clutch 236 may disengage to shift to a lower gear. During upshifting, the first one-way clutch 220 may disengage and the second one-way clutch 236 may engage to shift to a higher gear. At a lower gear, the first shaft 222 and second shaft 224 drivingly couple via a reduction set of a lower ratio compared to a ratio of a higher gear. At a higher gear, the first shaft 222 and second shaft 224 may drivingly couple via a reduction set of a higher ratio compared to a ratio of a lower gear.

For an example, for a first setting, the transmission motor system 200 may be in a first, lower gear, where the first reduction set 212 is selected to transmit rotational energy to drive the second shaft 224. During upshifting operations, the transmission 122 may be in the first gear, wherein the first reduction set 212 may drivingly couple the first and second shafts 222, 224. Transitioning between engaging the first reduction set 212 to engaging the second reduction set 214 may enable upshifting. For this example, the first one-way clutch 220 may be drivingly coupled and in a fully locked/engaged state with the second shaft 224, and the second one-way clutch 236 may be disengaged in a fully open/disengaged state. When performing an upshift, the first one-way clutch 220 may be controlled to a fully open/disengaged state and the second one-way clutch 236 may be controlled to a one-way clutch state by the control system 252. An input mover, such as the electric machine 112, may be controlled to slow the rotational speed of output of the mover. The slowing the rotational speed of the output of the mover may slow the input shaft to the transmission, such as the first shaft 222, to a calculated speed. The calculated speed of the input to the transmission and/or the first shaft 222 may be equal to the rotational speed of the second reduction set 214 and the output, such as the second shaft 224. The process of equalization of the rotational speed of the input and the rotational speed of the second reduction set 214 and output, may synchronize the second one-way clutch 236 with the first shaft 222. During synchronization, the difference in rotational speed between the second input and the second output to the second one-way clutch 236 may be reduced to zero or may be reduced below a first threshold of rotational speed. For an example embodiment, the second input to the second one-way clutch 236 may be rotationally and physically coupled to the first shaft 222. Likewise, the second output from the second one-way clutch 236 may be rotationally and physically coupled to the third gear 242. For example, a first rotational speed of the rotor of the electric machine 112 and the first shaft 222 may be slowed, such that the rotational speed of the second input to the second one-way clutch 236 is approximately equal to a second rotational speed of the second reduction set 214 at the second output of the second one-way clutch 236. For this example, the second rotational speed may be the rotational speed of the third gear 242, where the third gear 242 includes or is drivingly coupled to the second output of the second one-way clutch 236. Once synchronized, the second one-way clutch 236 may be transitioned by the control system 252 to a fully locked/engaged state with the first shaft 222.

For another example, for a second setting, the transmission motor system 200 may be in second, higher gear, where the second reduction set 214 is selected to transmit rotational energy to drive the second shaft 224. During a downshift operation, the vehicle may be in the second gear, wherein the second reduction set 214 may drivingly couple the first and second shafts 222, 224. Transitioning between engaging the second reduction set 214 to engaging the first reduction set 212 set may enable downshifting. For this example, the second one-way clutch 236 may be drivingly coupled and in a fully locked/engaged state with the first shaft 222. When performing a downshift, the second one-way clutch 236 may be controlled to a fully open/disengaged state and the first one-way clutch 220 may be controlled to a one-way clutch state. An input mover, such as the electric machine 112, may be controlled to speed up the rotational speed of output of the mover. The speeding up of the rotational speed of the output of the mover may speed up the input shaft to the transmission, such as the first shaft 222, to a calculated speed. The calculated speed of the input to the transmission and/or the first shaft 222 may be equal to the rotational speed of the first reduction set 212 and the output, such as the second shaft 224. The process of equalization of rotational speed of the input and rotational speed of the first reduction set 212 and output may synchronize the first one-way clutch 220 with the second shaft 224. During synchronization, the difference in rotational speed between an input and the output to the first one-way clutch 220 may be reduced to zero or may be reduced below a first threshold of rotational speed. For an example embodiment, the first output from the first one-way clutch 220 may be rotationally and physically coupled to the second shaft 224. Likewise, the first input to the first one-way clutch 220 may be rotationally and physically coupled to the second gear 234. During synchronization, the difference in rotational speed between the first input and the first output to the first one-way clutch 220 may be reduced to zero or may be reduced below a second threshold of rotational speed. The second threshold of rotational speed for the first one-way clutch 220 may be approximately the same of the first threshold of rotational speed for the second one-way clutch 236. For example, a third rotational speed of the rotor of the electric machine 112 and the first shaft 222 may be slowed, such that the rotational speed of the input is approximately equal a fourth rotational speed of the output of the first reduction set 212 and the first output of the first one-way clutch 220. For this example, the fourth rotational speed may the rotational speed of the second shaft 224, where the second shaft 224 is the first output of the first one-way clutch 220. Once synchronized, the first one-way clutch 220 may be transitioned by the control system 252 to the fully locked/engaged state with the second shaft 224.

For another example, the first and second one-way clutches 220, 236 may be used as part of a hill hold feature. As DCC clutches, at least one of the first or second one-way clutches may be controlled to the one-way clutch state while the other one-way clutch may be controlled to the fully locked/engaged state upon a controller of the control system 252 receiving a request to engage the hill hold feature. The hill hold feature may allow a vehicle using transmission 120, such as the vehicle 102, to drive forward while preventing the vehicle from rolling backwards on an incline. The hill hold feature may reduce energy losses, as the electric machine 112 or another mover may not have to provide the transmission 122 a holding torque at zero torque to prevent movement during operations on incline, such as idling. Additionally, the parking brakes may not be engaged when on an incline while the first and second one-way clutches 220, 236 are engaged using the hill hold feature.

For another example, the first and second one-way clutches 220, 236 may be engaged as part of a park lock feature upon a controller of the control system 252 receiving a request to engage the park lock feature. To act as a park lock or park brake for the transmission 122, the first and second one-way clutches 220, 236 may both be placed in a fully locked/engaged state.

For an alternate example of DCC clutches, the first and/or second one-way clutches 220, 236 may control to two states, including a fully engaged state and the one-way clutch state. The first and/or second one-way clutches 220, 236 may be two position one-way clutches, having two discrete modes. For this example, the first and/or second one-way clutches 220, 236 may be operable in the locked mode and partially locked mode. When using two position clutches, the first one-way clutch 220 and second one-way clutch 236 are arranged such as to rotate, such that the first one-way clutch 220 does not rotate to lock in the one-way clutch state when the second one-way clutch 236 is in the fully engaged state and vice versa.

A set of reference axes 301 are provided for comparison between views shown in FIG. 3A-B. The reference axes 301 indicate a y-axis, an x-axis, and a z-axis. In one example, the z-axis may be parallel with a direction of gravity and the x-y plane may be parallel with a horizontal plane that a dynamic controllable clutch 302 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 3A, a cutout and exploded view 300 of a dynamic controllable clutch 302 and a gear 312 are shown. The dynamic controllable clutch 302 may be a selectable one-way clutch, such as the first and/or second one-way clutches 220, 236. The gear 312 may be and act as the second gear 234 or the third gear 242. The dynamic controllable clutch 302 may be located radially about and centered on a longitudinal axis 304. The dynamic controllable clutch 302 may circumferentially surround the longitudinal axis 304. The dynamic controllable clutch 302 shown in view 300 is an example of one embodiment.

The clutch 302 may act as a linear motor, and therein may be formed of a stator 306 and a translator system 308. The stator 306 may stationary while the translator system 308 may move approximately linearly. The translator system 308 may translate or slide in an axial direction with respect to longitudinal axis 304.

The stator 306 may include wire coils, such as copper wire coils, and plates, such as steel plates, that may be used to generate electromagnetic forces to move the translator system 308 axially, with respect to axis 304. The translator system 308 may incorporate at least a magnet assembly 310 to be translated by the electromagnetic forces generated by the stator 306. The magnet assembly 310 may be formed of a single or a plurality of magnets. The single or plurality of magnets that form the magnet assembly 310 may be permanent magnets. The electromagnetic forces of the stator may push or pull the magnet assembly 310 and other components of the translator system 308 in first direction toward or in a second direction away from the gear 312.

The dynamic controllable clutch 302 may be formed of a coupling ring 314, a sliding sleeve 316, a friction plate 320, the magnet assembly 310 and a translator 324. The components of the stator 306 may be enclosed by and formed within a coupling ring 314. The sliding sleeve 316, friction plate 320, magnet assembly 310, and translator 324 may form the translator system 308. The coupling ring 314 may secure the dynamic controllable clutch 302 to the body of a transmission, such as transmission 122, or another part of a transmission block. A plurality of fasteners 318 may be enclosed by the material of the friction plate 320 and abut the gear 312. The fasteners 318 may fasten a control element 319 to the friction plate 320. The control element 319 may be positioned axially, with respect to the longitudinal axis 304, between the friction plate 320 and the gear 312.

The coupling ring 314 may provide support to and be located radially, with respect to longitudinal axis 304, about the magnet assembly 310. The coupling ring 314 may have an extension 315. The extension 315 may have a plurality of recesses, grooves and other features that may be used to couple or fasten to another component, such as a mount.

The magnet assembly 310 may be located radially, with respect to the longitudinal axis 304, about the translator 324. The magnet assembly 310 may be located axially, with respect to the longitudinal axis 304, between a first plate 322a and a second plate 322b. The first and second plates 322a, 322b may help fasten the magnet assembly 310 to the translator 324, preventing the magnet from moving axially, with respect to the longitudinal axis 304, separate from the translator 324. The coupling ring 314, sliding sleeve 316, magnet assembly 310, and translator 324 may be aligned, such that the coupling ring 314, sliding sleeve 316, magnet assembly 310, and translator 324 may be approximately centered about the longitudinal axis 304.

A first passage 312a may be formed from and located centrally within the gear 312. The first passage 312a may be approximately centered about the longitudinal axis 304 when the gear 312 is approximately centered about the longitudinal axis 304. The first passage 312a may have an inner surface 312b that may be radial and smooth with respect to the longitudinal axis 304. A plurality of first teeth 312c may be formed from or coupled to the gear 312. The plurality of teeth 312c may be located radially about the perimeter of the of the gear 312. Likewise, a plurality of cavities 312d may be located radially, with respect to the longitudinal axis 304, surrounded by material of the gear 312 between the inner surface 312b and first teeth 312c. The first teeth 312c may mesh with the teeth of another gear to drivingly couple the gear 312 to another gear. The first passage 312a may be of a first diameter 312e. The first diameter 312e may act as an inner diameter for the gear 312. The cavities 312d may be open to and positioned closest axially, with respect to the longitudinal axis 304, to the friction plate 320 and control element 319.

A second passage 320a may be formed from and located centrally within the friction plate 320. The second passage 320a may be approximately centered about the longitudinal axis 304 when the friction plate 320 is approximately centered about the longitudinal axis 304. A plurality of second teeth 320b may be located about the inner surface of the second passage 320a. The second teeth 320b may be complementary to a plurality of notches or grooves in a shaft, such as a shaft 333 with reference to FIG. 3B. The second passage 320a may be of a second diameter 320d. The second diameter 320d may act as an inner diameter for the friction plate 320.

A third passage 324a may be formed from and located centrally within the translator 324. The third passage 324a may be approximately centered about the longitudinal axis 304 when translator 324 is approximately centered about the longitudinal axis 304. A plurality of third teeth 324b may be located about the inner surface of the second passage 320a. The third teeth 324b may be complementary to a plurality of notches or grooves in a shaft, such as the shaft 333 with reference to FIG. 3B. The third passage 324a may be of a third diameter 324d. The third diameter 324d may act as an inner diameter for the translator 324.

A ring 326 may be positioned approximately radially, with respect to longitudinal axis 304, about the translator 324. The first plate 322a may partially enclose and be located radially, with respect to the longitudinal axis 304, about the ring 326. The ring 326 may be fit to and located radially about a groove 328 in the translator 324. The ring 326 may abut surfaces of the first plate 322a and translator 324. When inserted about the groove 328, the ring 326 may fasten the translator 324 and first plate 322a together. The ring 326 may prevent the translator 324 from being decoupled or misaligned with respect to the magnet assembly 310, first plate 322a, and second plate 322b. A ring similar in function and dimension to ring 326 may be partially enclose and located radially, with respect to the longitudinal axis 304, within the second plate 322b.

The translator 324, first plate 322a, second plate 322b, and magnet assembly 310 may move in an axial direction, with respect the longitudinal axis 304, therein moving the sliding sleeve 316. When components of the sliding sleeve 316 are pressed against the friction plate 320, the dynamic controllable clutch 302 may be referred to as locked against the gear 312. When locked the friction plate 320 and translator 324 may be drivingly coupled to and may rotate with the gear 312.

The friction plate 320 and translator 324 may circumferentially surround and couple to a drive shaft, such as the first shaft 222 or second shaft 224 with reference to FIG. 2, that may be approximately collinear with the longitudinal axis 304. When locked with the friction plate 320, the torque of the gear 312 may be transferred into a shaft via the friction plate 320 and translator 324.

Turning to FIG. 3B, it shows a cutout side view 330 is shown of the dynamic controllable clutch 302 and gear 312 in a clutch enclosure 332. The clutch enclosure 332 may be a part of a transmission block, such as the transmission block enclosing transmission system 120 and/or transmission 122. The clutch enclosure 332 surrounds the dynamic controllable clutch 302 and gear 312. The clutch enclosure 332 may form a housing and a fastening surface for the clutch 302. The clutch 302 may be located radially, with respect to longitudinal axis 304, about a shaft 333. The first passage 312a, second passage 320a, and third passage 324a may be located radially, with respect to longitudinal axis 304, about the shaft 333. The second and third diameters 320d, 324d may be greater than and enclose a diameter 333a of the shaft 333.

The coupling ring 314 may couple against the clutch enclosure 332, therein coupling the dynamic controllable clutch 302 to the clutch enclosure 332. The extension 315 of the coupling ring 314 may extend outside of the clutch enclosure via a passage. The passage may be centered on an axis that is approximately parallel with the longitudinal axis 304. The extension 315 may abut against an outer surface 336 of the clutch enclosure 332. The extension 315 may have a plurality of appendages 338 that may help fasten the coupling ring 314 to the clutch enclosure 332. The appendages 338 may be complementary with a plurality of holes in outer surface 336. When aligned such that the appendages 338 may be inserted into their complementary holes on the outer surface 336, the extension 315 may couple to the clutch enclosure 332.

The sliding sleeve 316 may press against the friction plate 320 with a plurality of springs 334. The sliding sleeve 316 may make surface sharing contact and abut the friction plate 320. A clip 340 that is circular in shape may make surface sharing contact with the friction plate 320. The clip 340 may be located axially, with respect to the longitudinal axis 304, between the sliding sleeve 316 and the friction plate 320. The clip 340 may be coupled to the gear 312 via a groove 341. Groove 341 may extend radially into the material of the gear 312 with respect to the longitudinal axis. The clip 340 may remain coupled to the gear 312 and may not translate in a direction along the longitudinal axis 304. The clip 340 may prevent the spinning or misalignment of the sliding sleeve 316 when abutting the friction plate 320. When misaligned against the friction plate 320, the sliding sleeve 316 may not be approximately centered on and radial to the longitudinal axis 304.

A land 342 may extend radially, with respect to the longitudinal axis 304 from the coupling ring 314. The land 342 may be fit to a groove 344 that extends radially, with respect to the longitudinal axis 304, into the material of the clutch enclosure 332.

The coupling ring 314 may have a plurality of lands 335 that extend radially toward the longitudinal axis 304. At least one of the lands 335 may be located radially about the magnet assembly 310 and axially between the first and second plates 322a, 322b, with respect to the longitudinal axis 304. The lands 335 may prevent the magnet assembly 310 and other components of the translator system 308 from moving axially, with respect to longitudinal axis 304 without a deliberate force generated by the stator 306.

The friction plate 320 may act as an input and the gear 312 may act as an output for the locking mechanism of dynamic controllable clutch 302. A plurality of locking elements, such as struts, may be hingingly coupled to the friction plate 320. The locking elements may be pressed upon by the springs 334 via the translation of the sliding sleeve 316 axially, with respect to the axis 304, toward the friction plate 320. Each of the cavities 312d may be complimentary with a locking element and an opening in the control element 319. When pressed by the springs 334, each of the locking elements may be pressed through the openings in the control element 319 and into the cavities 312d. The pressing of the locking elements into the cavities 312d may lock the gear 312 and friction plate 320, and drivingly couple the shaft 333 to the gear 312. Alternatively, the pressing of some of the locking elements into the cavities 312d may place the gear 312 and friction plate 320 into a OWC mode. For this example, there may be two types of locking elements for the cavities 312d, such that the dynamic controllable clutch 302 may engage in two to three discrete states of locking. The locking mechanism of the locking elements may be further illustrated via a schematic shown in FIG. 4.

A ring 346 may be located radially, with respect to the longitudinal axis 304, about translator 324. The sliding sleeve 316 may have a rim 347 that may be inserted axially, with respect to the longitudinal axis 304, between the ring 346 and a shoulder 348. The shoulder 348 may be formed and extend radially, with respect to the longitudinal axis 304, from the translator 324. The ring 346 may be used to fasten sliding sleeve 316 to translator 324.

A ring 382 may be located radially, with respect to longitudinal axis 304, about and fit to a groove 384. The groove 384 may be located radially, with respect to the longitudinal axis 304, about and formed from the shaft 333. The ring 382 may abut a surface 386 of the friction plate 320. The ring 382 may help fasten the friction plate 320 to shaft 333. Portions of the friction plate may extend into a groove 384 and a groove 388 of the shaft 333. Groove 388 may be fluidly coupled to a passage 390. Passage 390 may act as a passage for lubricant to flow between the volume of the clutch enclosure 332 and a bearing 392. The bearing 392 may support and allow the gear 312 to rotated freely about the shaft 333. The bearings 392 may be located radially, with respect to the longitudinal axis 304 between the gear 312 and the shaft 333, wherein the surface 312b may be in surface sharing contact with the bearings 392. The diameter 312e, with reference to FIG. 3A, may be greater than the diameter 394. Diameter 394 may be an outer diameter of the bearings 392.

FIG. 4 shows a diagram of a clutch engagement table 450. The columns of the clutch engagement column show example operational modes of the dynamic controllable clutch. Example modes depicted in the clutch engagement table 450 include a fully locked mode 452, a one-way clutch (OWC) mode 454, and an open mode 456. The degrees of movement and torque transfer in the locked mode 452 are shown in a first column 453. The degrees of movement and torque transfer in the OWC mode 454 are shown in a second column 455. The degrees of movement and torque transfer in open mode 456 are shown in a third column 457. The first row 458 shows the status of the output of the dynamic controllable clutch 302 and the second row 460 shows the status of the input of the dynamic controllable clutch 302. The modes may also be referred to as states in the clutch engagement table 450. The open mode 456 may also be referred to as a fully open mode due to the OWC mode 454 being partially open.

The direction of the torque may be represented by arrows. As shown by a diagram 462, arrows indicate torque may be transferred in a first direction 464 or a second direction 466. For the example diagram 462, the first direction 464 may indicate an anti-clockwise direction of movement and the second direction 466 may indicate a clockwise direction of movement. However, for alternative examples, the first direction 464 may be clockwise and the second direction 466 may be counter clockwise. A second table 470 shows if an arrow is darkened, such as in a first row 472, torque may be transferred. The second table 470 shows if an arrow is shaded a lighter color, such as in second row 474, torque may not be transferred.

The locked mode 452 may be the locked mode described in the first and second embodiment of the first and second one-way clutches 220, 236 with reference to FIG. 2. The locked mode 452 may be a closed mode and an engaged mode, where the dynamic controllable clutch 302 is engaged such as to rotationally couple an input and output of the dynamic controllable clutch 302. In the locked mode 452, the dynamic controllable clutch 302 may be in the fully locked/engaged state. The OWC mode 454 may be the partially locked mode in the first and second embodiment of the first and second one-way clutches 220, 236 with reference to FIG. 2. In the OWC mode, the dynamic controllable clutch 302 may be one-way clutch state. The open mode 456 may be the open mode and may act as a neutral mode described with respect first embodiment of the first and second one-way clutches 220, 236 with reference to FIG. 2. In the open mode 456, the dynamic controllable clutch 302 may be in the fully open/disengaged state. For an example of a first embodiment, the dynamic controllable clutch 302 may be able to engage in the locked mode 452, the OWC mode 454, and the open mode 456. For an example of a second embodiment, the dynamic controllable clutch 302 may be able to engage in the locked mode 452 and the OWC mode 454. For an example, the second embodiment of dynamic controllable clutch 302 may be used for the first and/or second one-way clutches 220, 236, where the first and second one-way clutches 220, 236 are configured to rotate in opposite directions as part of a transmission system.

Table 450 shows in the locked mode 452, the OWC mode 454, and the open mode 456, torque may be transferred to the input in the anti-clockwise and clockwise directions relative to the axis the dynamic controllable clutch 302 is centered about. In the fully locked mode 452 torque may be transferred to the output in the first direction 464 or second direction 466. For an example embodiment of the dynamic controllable clutch 302, when in the OWC mode 454 torque may be transferred in the first direction 464 but not the second direction 466. In the open mode 456 torque may not be transferred to the output in either the first direction 464 or second direction 466.

Turning to FIG. 5, it shows a schematic 500 of an example mechanism for engagements to lock a dynamic controllable clutch (DCC) 502. The dynamic controllable clutch 502 may be the first and/or second one-way clutches 220, 236 of FIG. 2. The dynamic controllable clutch 502 may be dynamic controllable clutch 302 of FIGS. 3A-3B. The schematic 500 shows the dynamic controllable clutch 502 engaged in the locked mode 452, the OWC mode 454, and the open mode 456.

The dynamic controllable clutch 502 may include an output 512, an input 514, and a plurality of coils that are electrically conductive, such as to carry an electrical current, and may be alternatively herein referred to as electrical coils. For an example of one embodiment there may be three electrical coils in the form of a first coil 516, a second coil 518, and a third coil 520. For an example of another embodiment, there may be a at least one coil that may be the first coil 516, second coil 518, or third coil 520. The input 514 may be located between the output 512 and the coils.

The input 514 and/or output 512 may rotate in a first direction 464 or a second direction 466. When drivingly coupled to the input 514, the output 512 may rotate with the input 514. When in the locked mode 452 the output 512 and input 514 may be locked, such as to be drivingly coupled and move together in either the first direction 464 or a second direction 466. When in the OWC mode 454 the output 512 and input 514 may be locked, such as to be drivingly coupled and move in the second direction 466. However, the output 512 and input 514 may be drivingly un-coupled and move independently from one another in the first direction 464. When in the open mode 456 the output 512 and input 514 may unlocked, such as to be drivingly un-coupled and move independently of each other in the first direction 464 or second direction 466.

A plurality of holes may pass through the input 514 and coils, such as the first coil 516, second coil 518, and third coil 520. There may be two types of holes in the form of a first hole 532 and a second hole 534. There may be a plurality of first and second holes 532, 534. Each of the first holes 532 may house a first spring 536. Each of the second holes 534 may house a second spring 538. The first and second springs 536, 538 may be variants of the springs 334 with reference to FIGS. 3A-3B. The dynamic controllable clutch 502 may have at least one of each of the first spring 536 and the second spring 538. However, the dynamic controllable clutch 502 may have a plurality of the first springs 536 and a plurality of the second spring 538.

The dynamic controllable clutch 502 may have two types of locking elements in the form of at least a first locking element 542 and at least a second locking element 544. The dynamic controllable clutch 502 may have at least one of each of the first locking element 542 and one of the second locking element 544. However, the dynamic controllable clutch 502 may have a plurality of first locking elements 542 and second locking elements 544. The first locking element 542 and second locking element 544 may be struts as shown in schematic 500. The first locking element 542 may be a first strut acting as a forward strut. The second locking element 544 may be a second strut acting as a reverse strut. Each of the first and second locking elements 542, 544 may be hingingly coupled to the input 514.

Each of the first springs 536 may press against and make surface sharing contact with one of the first locking elements 542. Each of the second springs 538 may press against and make surface sharing contact with the one of the second locking elements 544. Each of the first locking elements 542 may be hingingly rotated toward and be partially enclosed by a first cavity 546. Each of the second locking elements 544 may be hingingly rotated toward and be partially enclosed by a second cavity 548. The first springs 536 may pivotally bias the first locking elements 542 outwardly for locking the first locking elements 542 with the first cavities 546. The second springs 538 may pivotally bias the second locking elements 544 outwardly for locking the second locking elements 544 with the second cavities 548. The first and second cavities 546, 548 may be example variations of the cavities 312d with reference to FIGS. 3A-3B.

The first spring 536 may be springing coupled or joined to a first base 552. The second spring 538 may be springily coupled to a second base 554. The first spring 536 and first base 552 may be translated axially with respect to a first centerline 556 of the first hole 532. The second spring 538 and second base 554 may be translated axially with respect to a second centerline 558 of the second hole 534. For an example of one embodiment, the first base 552 and second base 554 may be ferric or electromagnetic, such that an electrical current through the first coil 516, second coil 518, and third coil 520 may drive the first base 552 and/or second base 554 axially along the first centerline 556 and/or second centerline 558, respectively. A plurality of electrical currents, where the electrical currents are different magnitudes, the first coil 516, second coil 518, and third coil 520 may drive the first base 552 and/or second base 554 to different positions. For this example, the first coil 516, second coil 518, and third coil 520 may act as a solenoid. For an example of one embodiment, the use of a single coil, such as the first coil 516, second coil 518, or third coil 520, may allow for the dynamic controllable clutch to be engaged in the locked mode 452 or the OWC mode 454, but not the open mode 456. However, it is to be appreciated that the mechanism for extending the springs and their respective bases may be non-limiting. Other methods of actuation may be used to translate the first and second springs 536, 538 to press against the first and second locking elements 542, 544, respectively.

For one example, in the locked mode 452, the first and second springs 536, 538 may be translated toward and press against the first and second locking elements 542, 544, respectively. A first condition of electrical current through the coils, such as the first coil 516, the second coil 518, and the third coil 520, may extend the first locking element 542 and the second locking element 544 via forces from the coils acting on the first base 552 and second base 554, respectively. Additionally, or alternatively, the first condition of electrical current through the coils, such as the first coil 516, the second coil 518, and the third coil 520, may prevent the first locking element 542 and the second locking element 544 from retracting via forces from the coils acting on the first base 552 and second base 554, respectively. The first and second locking elements 542, 544 may be rotated by the first and second springs 536, 538 into being partially enclosed by the first and second cavities 546, 548, respectively. The first and second locking elements 542, 544 may abut and be in surface sharing contact with surfaces of the first and second cavities 546, 548, respectively. The first locking elements 542 may prevent the input 514 from moving independently of the output 512 in the second direction 466, therein transferring torque between the input 514 and output 512. The second locking element 544 may prevent the input 514 from moving independently of the output 512 in the first direction 464, therein transferring torque between the input 514 and output 512.

For another example, in the OWC mode 454, the first springs 536 may be translated toward and pressed against the first locking element 542; however, the second spring 538 may be translated away or remain in place, such that the second spring 538 may not pressed against the second locking element 544. A second condition of electrical current through the coils, such as the first coil 516, the second coil 518, and the third coil 520, may retract the second locking element 544 but not the first locking element 542 via forces from the coils acting on the second base 554 and first base 552, respectively. Additionally or alternatively, the second condition of electrical current through the coils, such as the first coil 516, the second coil 518, and the third coil 520, may extend the first locking element 542 but not the second locking element 544 via forces from the coils acting on the first base 552 and second base 554, respectively. The first locking elements 542 may be rotated by the first springs 536 into being partially enclosed by the first cavities 546. Each of the first locking elements 542 may abut and be in surface sharing contact with surfaces of the first cavities 546. The second locking element 544 may not be rotated and may remain retracted into the input 514. The first locking element 542 may prevent the input 514 from moving independently of the output 512 in the first direction 464. When the input 514 spins in the second direction 466, the first locking element 542 may be pressed down into the input 514 by the output 512. Likewise, when the output 512 spins in the first direction 464 the first locking element 542 may be pressed down into the input 514 by the output 512.

For another example, in the open mode 456, the first and second springs 536, 538 may be translated away and not pressed against the first and second locking elements 542, 544, respectively. The first and second locking elements 542, 544 may be retracted into the input 514. A third condition of electrical current through the coils, such as the first coil 516, the second coil 518, and the third coil 520, may retract the first locking element 542 and the second locking element 544 via forces from the coils acting on the first base 552 and second base 554, respectively. Additionally, or alternatively, the third condition of electrical current through the coils, such as the first coil 516, the second coil 518, and the third coil 520, may prevent the first locking element 542 and the second locking element 544 from extending via forces from the coils acting on the first base 552 and second base 554, respectively. The input 514 may move freely in the first direction 464 or second direction 466. The output 512 may also move freely in the first direction 464 or second direction 466.

For an example, the vehicle and transmission, such as the vehicle 102, transmission system 120, and transmission 120 of FIG. 1 using the dynamic controllable clutch 502 may have a park lock feature, where when the vehicle 102 is parked or does not run, the DCC clutches of the transmission 122 may be closed and in an engaged state. When operating in the park lock feature, the vehicle 102 may be depowered, and the DCC clutches, including dynamic controllable clutch 502, may close and remain closed without a power source. For this example, the dynamic controllable clutch 502 may be depowered when in the locked mode 452, and therein have an electrical current of zero through the first coil 516, the second coil 518, and the third coil 520 during the first condition. The first condition of electrical current for the locked mode 452 and engaged state of the dynamic controllable clutch 502 may occur for a current less than a first threshold of electrical current. The second condition of electrical current for the OWC mode 454 and one-way clutch state may occur for a range of currents between a first threshold of electrical current and a second threshold of electrical current. And the third condition of current for the open mode 456 and the disengaged state may occur for an electrical current greater than the second threshold of electrical current. The first threshold of electrical current may be less than the second threshold of electrical current.

Transitioning between the locked mode 452, the OWC mode 454, and the open mode 456 may not be gradual, and may be a stepwise or discontinuous transition, where the transitioning may occur upon change in conditions with the electrical currents through the coils.

Turning to FIG. 6, it shows a method 600 of operation for shifting between two gearsets or other reduction sets via at least a pair of clutches, where at each clutch of the pair is specific to each reduction set. The pair of clutches include a first clutch and a second clutch, where the first clutch is a first DCC and the second clutch is a second DCC. For method 600, the first DCC is disengaged and the second DCC is disengaged, where each DCC is specific to a pair of separate gearsets or other reduction sets that drivingly couple at least two shafts, where each of the gearsets or reduction sets is of a different ratio. The method 600 may be used for the transmission system 120 and transmission 122 of FIGS. 1-2. The two separate gearsets or reduction sets may be the first reduction set 212 and the second reduction set 214 of FIG. 2. The two shafts may include the first shaft 222 and the second shaft 224. The first DCC and the second DCC may be the first one-way clutch 220 and the second one-way clutch 236, respectively, of FIG. 2. The DCC clutches of method 600 may be examples of the dynamic controllable clutch 302 of FIG. 3A-3B and/or the dynamic controllable clutch 502 of FIG. 5. Both of the first and second DCC clutches of method 600 may be transitioned between modes, such as the fully locked mode 452, the OWC mode 454, and the open mode 456 of FIGS. 4-5. Both the first and second DCC clutches of method 600 may be and include at least the components of dynamic controllable clutch 502 of FIG. 5. A control system and one or more controllers, such as the control system 252 and the first controller 254 and/or second controller 256 of FIG. 2, may comprise instructions to execute method 600.

Method 600 begins at 602. At 602 the operating conditions are determined, such that a control system comprising a controller or plurality of controllers may adjust conditions of the vehicle for the following steps of method 600. Operating conditions may be recorded via a plurality of sensors, such as sensors 260 of FIG. 2. The operating conditions may include the rotational speed and rotational acceleration of rotational elements that may be effect the engagement of the clutches. In particular, rotational speed and rotational acceleration of the inputs and outputs to the first clutch and the second clutch may be recorded. The controller running method 600 may estimate the difference in rotational speed (delta speed) between and rotational acceleration of the inputs and outputs of the first clutch and second clutch. The difference in rotational speed and rotational acceleration may be continuously monitored while the rotational speed for synchronizing the input and output to a clutch in further steps. A plurality of sensors, such as sensors 260 of FIG. 2, may continuously monitor and communicate rotational speed and rotational acceleration data to the controller and control system used by the method 600.

At 604, a command received to switch to transferring torque via a second reduction set that may rotationally couple a first shaft and a second shaft of the two shafts. There may be two reduction sets that drivingly couple the first shaft to the second shaft, where a first reduction set and the second reduction set drivingly couple the first shaft to the second shaft. The first reduction set may be a first gearset, and the second reduction set may be a second gearset. The first reduction set is complementary to a first clutch that may rotationally and selectively couple the first shaft. The first reduction set is complementary to a first clutch, where the first clutch is a DCC. Likewise, the second reduction set is complementary to a second clutch, where the second clutch is a DCC. To switch between the first reduction set and second reduction set, the first clutch is opened and the second reduction set is closed, such that the first reduction set does not drivingly couple the first and second shafts, and such that the second reduction set drivingly couples the first and second shafts. Method 600 proceeds to 606, where the method 600 determines the state of the first clutch: if the first clutch is open or closed. The first clutch may be open at 606 if in a disengaged state, such as open mode 456. The first clutch may be closed if in an engaged state or a one-way clutch state, such as the locked mode 452 or the OWC mode 454 of FIG. 4. If the first clutch is open (606 is NO), method 600 may proceed to 620.

Returning to 606, if the first clutch is closed (602 is YES), method 600 may proceed to 612 where the first clutch is shifted to an open state. 612 includes a plurality of sub steps, including 614 where the electrical current is altered to a first condition through the clutch coils of the first clutch. Upon altering the current for the first condition, the forces generated by the coils may pull on and change the positioning of components, such as the springs and the bases of the first clutch that physically couple the locking elements of the first clutch. Method 600 continues to 616 where the springs and base are retracted to a first position or a set of first positions via the coils. Upon retraction of the spring and bases, method 600 may continue to 618 where first locking elements and the second locking elements of the first clutch are retracted. When retracted, neither the first locking elements or the second locking elements contact the output of the first clutch, and therein the output may not rotationally couple to the input of the first clutch. For an example, a first locking elements and the second locking elements may be the first locking elements 542 and second locking elements 544 of FIG. 5. After 618, method 600 completes 612, and the first clutch may be open, transitioning to an open state from either a fully locked/engaged state or a OWC state. After 612, method 600 proceeds to 620.

At 620, method 600 determines the state of the second clutch: if the second clutch is opened or closed. The second clutch may be opened at 620 if in a disengaged state, such as during open mode 456. The second clutch may be closed if in an engaged state or a one-way clutch state, such as the locked mode 452 or the OWC mode 454, respectively. If the second clutch is closed (620 is YES), method 600 may end. If the second clutch is open (620 is NO), method 600 may proceed to 622, where the second clutch is closed.

622 includes a plurality of sub steps, such as 624. At the start of 622, the current to the coils may be at the first condition, such that a plurality of all locking elements and their respective components are retracted in the second clutch as the first clutch is after opening. At 624 the electrical current to the coils may be altered to a second condition through the clutch coils of the second clutch. Upon altering the current to the second condition, the forces generated by the coils may pull on components, such as the springs and the bases of some locking elements. At the second condition, the current through the coils may generate forces that selectively pull on components. The second condition is different from the first condition, where the second condition is a half-way condition between the first condition and a third condition, where some components that may be affected and pulled upon by the coils may extend while others do not extend. For example, current at the second condition may generate forces that pull on a first set of bases and a first set of springs but not a second set of bases and a second set of springs. The first set of bases and springs may be one or more of the first base 552 and first spring 536 of FIG. 4. The second set of bases and springs may be one or more of the second base 554 and second spring 538 of FIG. 4. After 624, method 600 continues to 626, where components acted on via the coils at the first condition are translated and extended toward their respective components. For example, the first set of bases and the first set of springs may be translated toward a first set of components at 626. The first set of locking components may include one or more of the first locking element 542 of FIG. 4. After 626, method 600 continues to 628 where a plurality of first locking components extends. The extension of the first locking components may be driven by their respective springs and bases driven by the second condition of current, where the springs may contact the first locking components. For example, the first set of bases and the first set of springs may extend a plurality of first components complementary to the first set of bases and first set of springs. At 628, a plurality of second locking components do not extend, as the respective springs and bases to the second locking components are not driven by the second condition of current. The second locking components may include one or more of the second locking elements 544 of FIG. 4. At 630, the first locking components fully extend, and the second clutch enters an OWC state. At the OWC state of 630, the first locking components may contact the output of the second clutch, therein rotationally coupling the output to an input of the second clutch when the input is rotated in a specific direction. Method 600 continues to 632, where the rotational speed is equalized between the input and the output of the second clutch. The equalization of speed between the input and output of the second clutch may be referred to additionally and alternatively as synchronizing or the synchronization of the second clutch. During equalization, the control system and respective controllers may adjust the speed between the input and the output, where the controller may increase or decrease the rotational speed of the motor to the input or the output. Likewise, the control system and respective controllers may monitor the rotational speed of motor to the input and output via sensors, during speed adjustments. When the difference in speed between the input and output (delta speed) reaches approximately 0 or below a threshold of speed at 632, the speed of second clutch is equalized and method 600 continues to 634.

At 634, the current to the coils may be altered to the third condition through the clutch coils of the second clutch. The third condition is different from the second condition and the first condition. Upon altering the current to the third condition, the forces generated by the coils may pull on components, such as the springs and the bases of locking components. At the third condition, all component that may be affected and pulled upon by the coils, may extend or are extended. At the third condition, the current through the coils may generate forces where all bases and springs complementary to the first and second components are pulled upon. For example, the current at the third condition may continue to generate forces that pull on the first set of bases and the first set of springs, such that the first locking elements remain extended. Additionally, the current at the third condition may generate forces that pull on the second set of bases and the second set of springs complementary to the second components. After 634, method 600 continues to 636, where components acted on via the coils at the third condition are translated and extended toward their respective locking components. For example, the second set of bases and the second set of springs may be translated toward the second set of components at 636. After 636, method 600 continues to 638 where the second locking components extend. The extension of the second locking components may be driven by their respective springs and bases that are driven by the third condition of current, where the springs may contact and push upon the second locking components. For example, the second set of bases and the second set of springs may extend the second locking components complementary to the second set of bases and the second set of springs. At 640, the second locking components fully extend, and the second clutch enters a fully locked/engaged state. At the fully locked/engaged state of 640, the first and second locking components may contact the output of the second clutch, therein rotationally coupling the output to the input, when either the output or input is rotated. After 640, method 600 may exit 622 and end.

It is to be appreciated, that some the sub steps of 622 for closing the second clutch may be optional under specific conditions. For example, if the second clutch is closed but in a one-way clutch state, 624, 626, 628, and 630 of 622 may be skipped, as the second clutch at the OWC state at 630. For this example, the second clutch may be at a OWC state when the vehicle is operating using a hill hold feature, where the first clutch may be closed and the second clutch is in a OWC state.

Method 600 may be for downshifting or upshifting. For example, if the first clutch selectively couples a first reduction set that is of higher ratio than the reduction set selectively coupled via the second clutch, method 600 may downshift. For another example, if the first clutch selectively couples first reduction set that is of a higher ratio than the reduction set selectively coupled via the second clutch, method 600 may upshift. Additionally, method 600 may be completed where the roles of first clutch and second clutch described in method 600 are reversed. For example, the second clutch may be open via 612 instead of the first clutch. Likewise, the first clutch may be closed via 622 instead of the second clutch.

Thus, disclosed herein is a two speed transmission that may incorporate at least two reduction sets, where each reduction set includes dynamic controllable clutch. Each reduction set may dringly couple at least two shafts, wherein a first reduction set may be selectively coupled to a first shaft via a first DCC, and a second reduction set may be selectively coupled to a second shaft via a second DCC. The first and second DCCs are dynamically controllable to transition between a plurality of discrete states, where at least one or both of the first and/or second DCCs are a dynamic one-way clutch. Each reduction set may be of a ratio of a different effective distance, such that each reduction set may produce different rotational speed and torque outputs for the transmission. The DCC may be used to increase the speed of rotation, rotation per minute (RPM), of an output element up to the same speed as a rotating element. As dynamic clutches, the first and second DCCs may absorb the change of kinetic energy of the non-rotating element. The rotating element may be an input element and the stationary element may be an output element.

In another representation, the disclosure includes a transmission system for a vehicle, comprising: an input configured to couple to a prime mover of the vehicle; a first gear ratio; a second gear ratio; a first dynamic controllable clutch (DCC); a second dynamic controllable clutch (DCC); an output; and a controller comprising instructions stored in non-transitory memory that are executable by the controller to: operate in second gear with the first DCC in an open mode while delivering torque from the input to the output via the second DCC and the second gear ratio, wherein the first DCC is in a completely disengaged state in the open mode, and wherein the second DCC is in an engaged state in the second gear, and transition from operating in the second gear to operating in first gear, wherein the transition includes: transitioning the first DCC from the open mode to a one-way clutch (OWC) mode, and then transitioning the first DCC from the OWC mode to a locked mode.

For example, each of the DCCs may have three discrete states: a first state, a second state, and a third state. The discrete states may include a fully locked/engaged state, a one-way clutch (OWC) state, and a fully open/disengaged state. In another example, the DCC may have two discrete states. For this other example, the discrete states may include a fully locked/engaged state and a one-way clutch (OWC) state.

Note that the example control and estimation routines included herein can be used with various electric machines and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein. As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system for a vehicle, comprising:
   an input configured to couple to a prime mover of the vehicle;
   a first gear ratio;
   a second gear ratio;
   a first dynamic controllable clutch (DCC) operable in an engaged state, and a disengaged state;
   a second dynamic controllable clutch (DCC) operable in the engaged state, the disengaged state, and a one-way clutch state;
   an output; and
   a controller comprising instructions stored in non-transitory memory that are executable by the controller to:
     adjust a state of the first DCC and the second DCC to selectively engage the first gear ratio and the second gear ratio for providing torque transfer from the input to the output of the transmission system; and
     operate the vehicle at a first speed, wherein the first DCC is in an open mode and the second DCC is in a closed mode, wherein in the open mode the first DCC does not couple a second shaft to the first gear ratio, wherein in the closed mode the second DCC couples a first shaft to the second gear ratio, wherein the first DCC is in the disengaged state in the open mode, and wherein the second DCC is in the engaged state in the closed mode.

2. The transmission system of claim 1, wherein the controller further comprises instructions to:
   transition the second DCC from the closed mode to the open mode, wherein the second DCC is transitioned from the engaged state to the disengaged state, and wherein in the open mode the second DCC decouples first shaft from the second gear ratio in the open mode.

3. The transmission system of claim 2, wherein the first DCC further includes the one-way clutch state, and wherein the controller further comprises instructions to:
   transition the first DCC from the open mode to the closed mode, wherein the first DCC is transitioned from the disengaged state to the one-way clutch state, and the first DCC is transitioned from the one-way clutch state to the engaged state, and wherein in the closed mode the first DCC couples the second shaft to the first gear ratio.

4. The transmission system of claim 3, wherein the first gear ratio is a higher gear ratio than the second gear ratio.

5. The transmission system of claim 3, wherein the transmission system is a two speed transmission, wherein transitioning the first DCC to the closed mode and the second DCC to the open mode places the transmission system at the first speed, and wherein transitioning the first DCC to the open mode and the second clutch to the closed mode places the transmission system at a second speed.

6. The transmission system of claim 1, wherein the controller receives a request to operate a park lock feature, and wherein the controller in response executes instructions to transition the first DCC and the second DCC to the engaged state when the vehicle is parked.

7. The transmission system of claim 1, wherein the controller further receives a request to operate a hill hold feature, and wherein the controller in response executes instructions to transition at least one of the first DCC or the second DCC to the engaged state, and transition the second DCC to the one-way clutch state.

8. The transmission system of claim 1, wherein the second DCC includes a selectable one-way clutch.

9. The transmission system of claim 1, wherein the first DCC further includes the one-way clutch state, wherein the first DCC or the second DCC is transitioned between the engaged state, the disengaged state, and the one-way clutch state via actuation of one or more locking elements, and wherein the locking elements are struts and are pivoted when actuated.

10. The transmission system of claim 9, wherein the first DCC and the second DCC each include at least a first locking element and at least a second locking element, wherein the first locking element and the second locking element are retracted during the disengaged state, wherein transitioning to the one-way clutch state from the disengaged state extends the first locking element while the second locking element remains retracted, and wherein transitioning from the one-way clutch state to the engaged state extends the second locking element.

11. The transmission system of claim 1, wherein the first DCC and the second DCC are electromagnetically operated.

12. The transmission system of claim 10, wherein the first DCC and the second DCC use a plurality of electrically conductive coils and electrical currents to switch between states, and wherein the electrical currents are at a first condition for the engaged state, the electrical currents are at a second condition for the disengaged state, and the electrical currents are at a third condition for the one-way clutch state.

13. A transmission system for a vehicle, comprising:
an input configured to couple to a prime mover of the vehicle;
a first gear ratio;
a second gear ratio;
a first dynamic controllable clutch (DCC) operable in an engaged state, a disengaged state, and a one-way clutch state;
a second dynamic controllable clutch (DCC) operable in the engaged state, the disengaged state, and the one-way clutch state;
an output; and
a controller comprising instructions stored in non-transitory memory that are executable by the controller to:
during a first setting, operate the first DCC and the second DCC, wherein the first DCC is in the engaged state, and torque is transferred from the input to the output via the first DCC while maintaining the second DCC in the disengaged state; and
during a second setting, transition the first DCC from the engaged state to the disengaged state; transition the second DCC to the one-way clutch state from the disengaged state; synchronize the input and the output, wherein change of a first rotational speed of the input is approximately the same as a second rotational speed of the output; and transition the second DCC from the one-way clutch state to the engaged state.

14. The transmission system of claim 13, wherein the first DCC and the second DCC are operable in a plurality of discrete states, and wherein the first DCC and the second DCC are not gradually transitioned between the plurality of discrete states.

15. The transmission system of claim 13, wherein the controller further comprises instructions to: during a first condition, electrically conductive coils of the first DCC retract a plurality of first locking elements and a plurality of second locking elements, transitioning the first DCC to the disengaged state, and during a second condition, operate the second DCC in the engaged state to transfer the torque from the input to the output via the second gear ratio and second DCC, wherein the first DCC is completely disengaged during the second condition.

16. The transmission system of claim 14, wherein the first gear ratio is a higher gear ratio than the second gear ratio, and wherein transitioning to the first setting enables upshifting and transitioning to the second setting enables downshifting.

17. A method for shifting gears in a transmission, comprising:
operating with a first dynamic controllable clutch (DCC) and a second dynamic controllable clutch (DCC) in a first setting, wherein the first DCC is in an engaged state to transfer torque from a first input to a first output and selectively couples a first shaft to a second shaft via a first reduction set, and the second DCC is in a disengaged state to not transfer torque from a second input to a second output and does not selectively couple the first shaft to the second shaft via a second reduction set that is complementary to the second DCC;
transitioning the first DCC and second DCC from the first setting to a second setting, such that:
the first DCC transitions to the disengaged state, wherein the first DCC does not transfer torque from the first input to the first output, and decouples the first reduction set from coupling the first shaft to the second shaft;
the second DCC transitions from the disengaged state to a partially engaged state, wherein the second DCC transitions to a one-way clutch mode, and wherein the second DCC transfers torque from the second input to the second output during rotation in a first direction;
a difference in rotational speed between the second input and the second output reduces below a threshold of rotational speed; and
the second DCC transitions from the partially engaged state to the engaged state, wherein the second DCC transfers torque from the second input to the second output during rotation in the first direction or a second direction, and wherein the second direction is opposite to the first direction.

18. The method of claim 17, wherein the first DCC and the second DCC are transitioned to the engaged state, the partially engaged state, and the disengaged state, via change in conditions of current through electrically conductive coils where: during a first condition, the electrically conductive coils of the DCC retract a plurality of first locking elements and a plurality of second locking elements, transitioning the DCC to the disengaged state; wherein during a second condition the electrically conductive coils the DCC extend the first locking elements and the second locking elements, transitioning the DCC to the disengaged state; and wherein during a third condition the electrically conductive coils of the DCC extend the first locking elements but not the second locking elements, transitioning the DCC to the partially engaged state.

\* \* \* \* \*